US011669242B2

(12) United States Patent
Xiong

(10) Patent No.: US 11,669,242 B2
(45) Date of Patent: Jun. 6, 2023

(54) SCREENSHOT METHOD AND ELECTRONIC DEVICE

(71) Applicant: Huawei Technologies Co., Ltd., Shenzhen (CN)

(72) Inventor: Liudong Xiong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 12 days.

(21) Appl. No.: 17/609,109

(22) PCT Filed: Apr. 28, 2020

(86) PCT No.: PCT/CN2020/087442
§ 371 (c)(1),
(2) Date: Nov. 5, 2021

(87) PCT Pub. No.: WO2020/224485
PCT Pub. Date: Nov. 12, 2020

(65) Prior Publication Data
US 2022/0214802 A1 Jul. 7, 2022

(30) Foreign Application Priority Data
May 7, 2019 (CN) .......................... 201910377187.X

(51) Int. Cl.
*G06F 3/048* (2013.01)
*G06F 3/04886* (2022.01)
(Continued)

(52) U.S. Cl.
CPC ...... *G06F 3/04886* (2013.01); *G06F 3/04845* (2013.01); *H04M 1/72403* (2021.01); *G06F 2203/04803* (2013.01)

(58) Field of Classification Search
CPC ............. G06F 3/04886; G06F 3/04845; G06F 2203/04803; H04M 1/72403
See application file for complete search history.

(56) References Cited

U.S. PATENT DOCUMENTS 4,475,131 A * 10/1984 Nishizawa ............... H04N 5/77
257/E27.128
5,046,159 A * 9/1991 Hamanaka ............. G02B 3/005
355/1
(Continued)

FOREIGN PATENT DOCUMENTS

CN 102681829 A 9/2012
CN 106126016 A 11/2016
(Continued)

OTHER PUBLICATIONS

ITU-T H.264, "Series H: Audiovisual and Multimedia Systems, Infrastructure of audiovisual services—Coding of moving video, Advanced video coding for generic audiovisual services," Apr. 2017, 812 pages.

Primary Examiner — David E Choi
(74) Attorney, Agent, or Firm — Conley Rose, P.C.

(57) ABSTRACT

A screenshot method includes displaying, by a terminal, a first interface including N areas, receiving, by the terminal, a first operation of a user, displaying, by the terminal, a second interface in response to the first operation, where the second interface includes N controls that are in a one-to-one correspondence with the N areas, and each of the N controls is used to select or deselect content of a corresponding area, receiving, by the terminal, a second operation on the N controls, determining, by the terminal, a selected area in the N areas in response to the second operation, receiving, by the terminal, a third operation, and generating, by the terminal, a first picture in response to the third operation, where the first picture includes content of the selected area in the N areas.

21 Claims, 27 Drawing Sheets

(51) Int. Cl.
*H04M 1/72403* (2021.01)
*G06F 3/04845* (2022.01)

(56) References Cited

U.S. PATENT DOCUMENTS

| | | | | |
|---|---|---|---|---|
| 7,624,304 | B2 * | 11/2009 | Thiagarajan | G06F 11/366 |
| | | | | 717/124 |
| 8,705,935 | B2 * | 4/2014 | Ikeda | H04N 21/4884 |
| | | | | 345/419 |
| 9,076,231 | B1 * | 7/2015 | Hill | G06F 3/04842 |
| 10,902,012 | B1 * | 1/2021 | Breslau | G06F 16/86 |
| 2004/0223731 | A1 * | 11/2004 | Ozawa | G09G 5/00 |
| | | | | 348/E7.054 |
| 2009/0150868 | A1 * | 6/2009 | Chakra | G06F 11/3692 |
| | | | | 717/125 |
| 2011/0029955 | A1 * | 2/2011 | McKaskle | G06F 8/38 |
| | | | | 717/125 |
| 2013/0054418 | A1 * | 2/2013 | Yang | H04W 4/50 |
| | | | | 705/26.1 |
| 2017/0169735 | A1 * | 6/2017 | Lablans | H04L 9/0841 |
| 2017/0277403 | A1 | 9/2017 | Huang et al. | |
| 2018/0214777 | A1 * | 8/2018 | Hingorani | A63F 13/5255 |
| 2022/0043544 | A1 * | 2/2022 | Su | G06F 3/0482 |
| 2022/0214802 | A1 * | 7/2022 | Xiong | G06F 3/04842 |

FOREIGN PATENT DOCUMENTS

| | | |
|---|---|---|
| CN | 106843665 A | 6/2017 |
| CN | 106911850 A | 6/2017 |
| CN | 106940621 A | 7/2017 |
| CN | 107301013 A | 10/2017 |
| CN | 107977144 A | 5/2018 |
| CN | 108563382 A | 9/2018 |
| CN | 109005446 A | 12/2018 |
| CN | 109032470 A | 12/2018 |
| CN | 110231905 A | 9/2019 |
| EP | 3220249 A1 | 9/2017 |
| JP | 2013171365 A | 9/2013 |
| WO | 2017101445 A1 | 6/2017 |

* cited by examiner

FIG. 3A-2

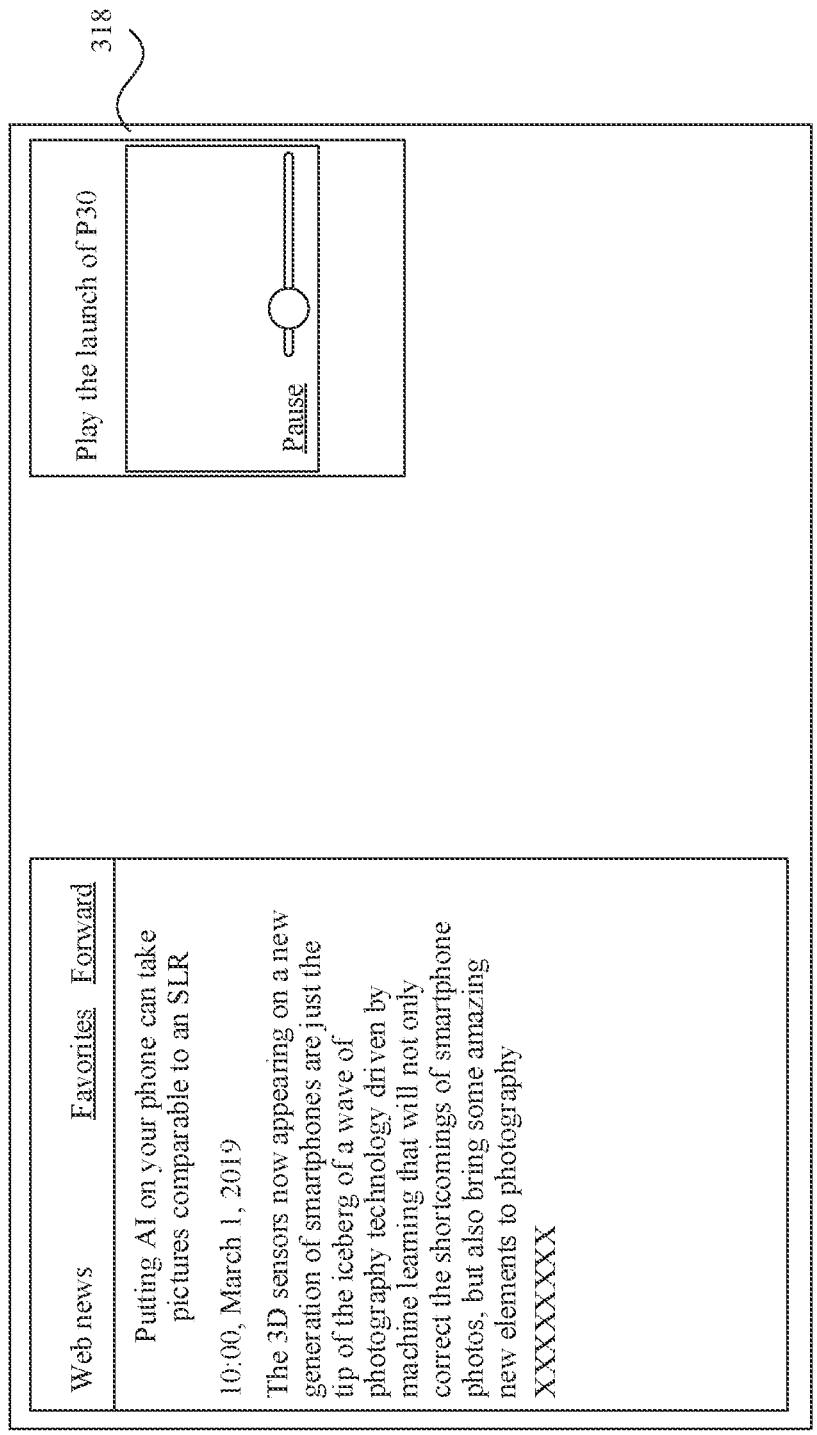

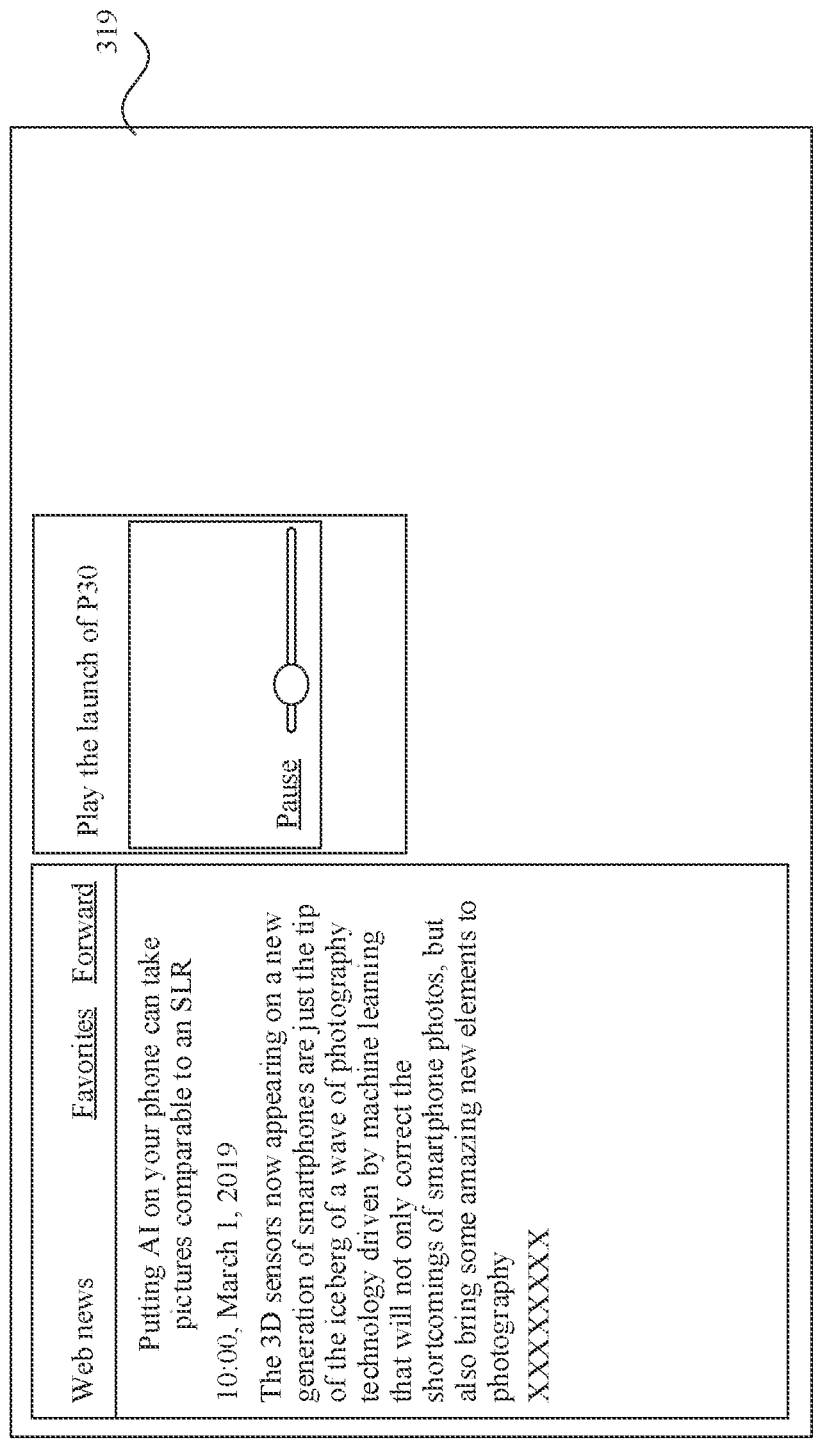

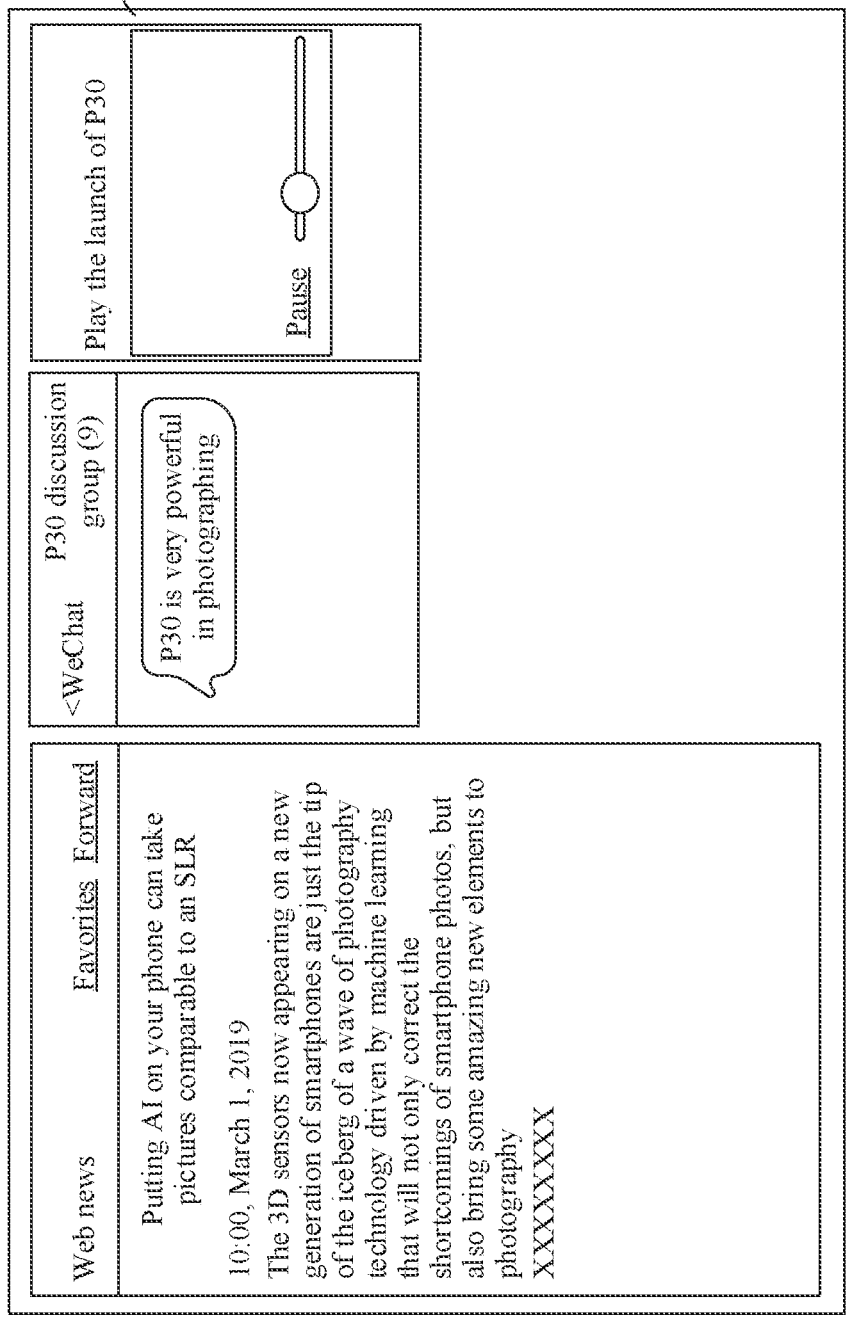

CONT. FROM FIG. 3F-1

Web news    Favorites    Forward    324

Putting AI on your phone can take pictures comparable to an SLR

10:00, March 1, 2019

The 3D sensors now appearing on a new generation of smartphones are just the tip of the iceberg of a wave of photography technology driven by machine learning that will not only correct the shortcomings of smartphone photos, but also bring some amazing new elements to photography

XXXXXXXXXXXXXXXXXX
XXXXXXXXXXXXXXXXXX
XXXXXXXXXXXXXXXXXX
XXXXXXXXX and

<WeChat   P30 discussion group    325

P30 is very powerful in photographing

FIG. 3F-2

CONT. FROM FIG. 3G-1

327 — Web news    Favorites    Forward

Putting AI on your phone can take pictures comparable to an SLR

10:00, March 1, 2019

The 3D sensors now appearing on a new generation of smartphones are just the tip of the iceberg of a wave of photography technology driven by machine learning that will not only correct the shortcomings of smartphone photos, but also bring some amazing new elements to photography XXXXXXXXXXXXXXXXXXXX
XXXXXXXXXXXXXXXXXXXX
XXXXXXXXXXXXXXXXXXXX
XXXXXXXXXXXXXXXXXXXX
XXXXXXXXXXXXXXXXXXXX
XXXXXXXXXXXXXXXXXXXX
XXXXXXXXXXXXXXXXXXXX
XXXXXX Remarks
XXXXXXXXXXX
Related recommendation
XXXXXXXXXXXXX and 328 — <WeChat>  P30 discussion group P30 is very powerful in photographing

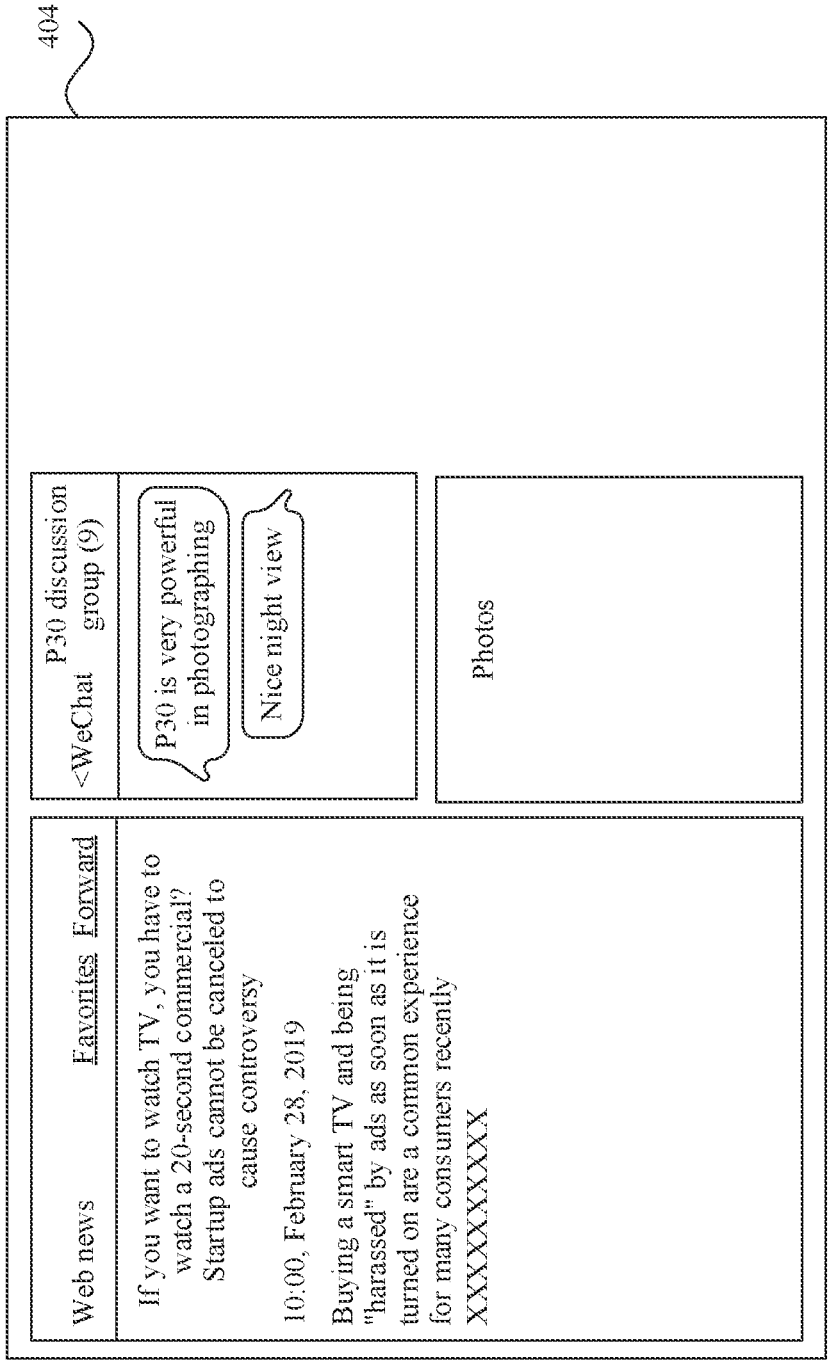

SCREENSHOT METHOD AND ELECTRONIC DEVICE

CROSS-REFERENCE TO RELATED APPLICATIONS

This is a U.S. National Stage of International Patent Application No. PCT/CN2020/087442 filed on Apr. 28, 2020, which claims priority to Chinese Patent Application No. 201910377187.X filed on May 7, 2019. Both of the aforementioned applications are hereby incorporated by reference in their entireties.

TECHNICAL FIELD

This application relates to the field of communications technologies, and in particular, to a screenshot method and an electronic device.

BACKGROUND

A screenshot function is a common feature of a mobile phone. An existing screenshot method is to capture an entire interface displayed on a current screen of the mobile phone, and save the entire interface as a picture. However, with increasingly powerful functions of mobile phones, an increasing quantity of mobile phones can implement dual-screen or even multi-screen display, that is, interfaces of a plurality of applications are displayed in one interface on a screen. In this case, a portion of the interface displayed on the screen of the mobile phone needs to be frequently captured. If the existing screenshot method is still used, after the entire interface is captured, the captured picture needs to be edited by using an edition tool built in the mobile phone or third-party image retouching software. This is a relatively complex operation, and user experience is poor.

SUMMARY

This application provides a screenshot method and an electronic device, to quickly take a screenshot of a specific area on a screen, thereby improving user experience.

According to a first aspect, this application provides a method, including:

A terminal displays a first interface, where the first interface includes N areas, and N is an integer greater than or equal to 2. The terminal receives a first operation of a user. The terminal displays a second interface in response to the first operation, where the second interface includes N controls, the N controls are in a one-to-one correspondence with the N areas, and each of the N controls is used to select or deselect content of a corresponding area. The terminal receives a second operation of the user, where the second operation is an operation on the N controls. The terminal determines a selected area in the N areas in response to the second operation. The terminal receives a third operation of the user. The terminal generates a first picture in response to the third operation, where the first picture includes content of the selected area in the N areas, or the terminal generates M pictures in response to the third operation, where each of the M pictures includes content of one of selected X areas in the N areas.

It can be learned that, in the screenshot method provided in this embodiment of this application, a mobile phone may automatically identify display areas of a plurality of application windows on a screen, and may automatically capture, based on selection by the user, content of an application window required by the user, so as to quickly take a screenshot of a specific area on a GUI, meet user's personalized requirements, and improve user experience.

In a possible implementation, each of the N areas displays a window of an application or a part of a home screen interface.

In a possible implementation, a size and/or a location of the selected area in the N areas in the first picture are/is the same as a size and/or a location of the selected area in the N areas in the first interface. Alternatively, a size and a location of the selected area in the N areas in the first picture are different from a size and a location of the selected area in the N areas in the first interface.

In a possible implementation, before the terminal generates the first picture, or the terminal generates the M pictures, and after the terminal receives the first operation of the user, the method further includes: The terminal performs a screenshot operation on the first interface to obtain a second picture.

That the terminal generates a first picture, or the terminal generates M pictures includes: The terminal generates the first picture based on the second picture, or the terminal generates the M pictures based on the second picture.

Therefore, this embodiment of this application provides a method for obtaining content of an application window selected by a user.

In a possible implementation, the method further includes: The terminal obtains the size and/or the location of the selected area in the N areas in the first interface.

That the terminal generates the first picture based on the second picture, or the terminal generates the M pictures based on the second picture includes: The terminal generates the first picture based on the size and/or the location of the selected area in the N areas in the first interface and the second picture, or the terminal generates the M pictures based on the size and/or the location of the selected area in the N areas in the first interface and the second picture.

In a possible implementation, that the terminal generates the first picture based on the second picture includes: The terminal crops content of an unselected area in the N areas in the second picture, to obtain the first picture. Alternatively, the terminal modifies content of an unselected area in the N areas in the second picture to a preset pattern, to obtain the first picture.

In some embodiments, a size and/or a location of each selected application window in the first picture are/is the same as a size and a location of each selected application window in the first interface. In some other embodiments, the terminal may further adjust each reserved selected application window, for example, adjust a size or a location. In this case, a location and/or a size of each selected application window in the first picture are/is different from a location and/or a size of each selected application window in the first interface, so that the first picture is more beautiful and compact, thereby meeting diversified requirements of the user.

In a possible implementation, that the terminal generates the first picture based on the second picture further includes: The terminal separately crops content of selected areas in the N areas from the second picture, and synthesizes the content of the cropped areas to obtain the first picture.

In some embodiments, the content of the selected areas is directly synthesized to obtain the first picture. In this case, a size and/or a location of each selected application window in the first picture are/is the same as a size and a location of each selected application window in the first interface. In some other embodiments, the mobile phone may adjust each selected cropped application window; for example, adjust a size or a location. In this case, a location and/or a size of each selected application window in the first picture are/is different from a location and/or a size of each selected application window in the first interface, so that the first picture is more beautiful and compact, thereby meeting diversified requirements of the user.

In a possible implementation, before the terminal generates the first picture, or the terminal generates the M pictures, the method further includes: The terminal obtains a cache of a decor view of an application corresponding to the selected area in the N areas.

That the terminal generates a first picture, or the terminal generates M pictures includes: The terminal generates the first picture based on the cache of the decor view of the application corresponding to the selected area in the N areas, or the terminal generates the M pictures based on the cache of the decor view of the application corresponding to the selected area in the N areas.

The cache of the decor view of each application is content displayed by each application on the current screen. Therefore, this embodiment of this application provides another method for obtaining content of a selected application window.

In a possible implementation, the method further includes: The terminal obtains the size and/or the location of the selected area in the N areas in the first interface.

That the terminal generates the first picture based on the cache of the decor view of the application corresponding to the selected area in the N areas, or the terminal generates the M pictures based on the cache of the decor view of the application corresponding to the selected area in the N areas includes: The terminal generates the first picture based on the cache of the decor view of the application corresponding to the selected area in the N areas and the size and/or the location of the selected area in the N areas in the first interface, or the terminal generates the M pictures based on the cache of the decor view of the application corresponding to the selected area in the N areas and the size and/or the location of the selected area in the N areas in the first interface.

In some embodiments, the terminal displays content of each obtained application window based on a size and a location of the selected obtained application window in the first interface. In this case, a size and/or a location of each selected application window in the first picture are/is the same as a size and a location of each selected application window in the first interface. In some other embodiments, the mobile phone may adjust each selected application window, for example, adjust a size or a location. In this case, a location and/or a size of each selected application window in the first picture are/is different from a location and/or a size of each selected application window in the first interface, so that the first picture is more beautiful and compact, thereby meeting diversified requirements of the user.

In a possible implementation, the second interface further includes N lock controls, the N lock controls are in a one-to-one correspondence with the N areas, and the lock control is used to lock or unlock content of a corresponding area. Before the terminal receives the third operation of the user, the method further includes: The terminal receives a fourth operation of the user, where the fourth operation is an operation on the N lock controls. The terminal determines a locked area in the N areas in response to the fourth operation.

After the terminal generates the first picture in response to the third operation, the method further includes:

The terminal displays the first interface. The terminal receives a fifth operation of the user. The terminal displays a third interface in response to the fifth operation, where a locked area in the N areas in the third interface is a selected area by default.

According to a second aspect, a terminal is provided, including a processor, a memory, and a touchscreen. The memory and the touchscreen are coupled to the processor, the memory is configured to store computer program code, the computer program code includes computer instructions, and the terminal is enabled to perform the following operations when the processor reads the computer instructions from the memory:

displaying a first interface, where the first interface includes N areas, and N is an integer greater than or equal to 2; receiving a first operation of a user; displaying a second interface in response to the first operation, where the second interface includes N controls, the N controls are in a one-to-one correspondence with the N areas, and each of the N controls is used to select or deselect content of a corresponding area; receiving a second operation of the user, where the second operation is an operation on the N controls; determining a selected area in the N areas in response to the second operation; receiving a third operation of the user; and generating a first picture in response to the third operation, where the first picture includes content of the selected area in the N areas, or generating M pictures in response to the third operation, where each of the M pictures includes content of one of selected X areas in the N areas.

In a possible implementation, each of the N areas displays a window of an application or a part of a home screen interface.

In a possible implementation, a size and/or a location of the selected area in the N areas in the first picture are/is the same as a size and/or a location of the selected area in the N areas in the first interface. Alternatively, a size and a location of the selected area in the N areas in the first picture are different from a size and a location of the selected area in the N areas in the first interface.

In a possible implementation, before the generating, by the terminal, a first picture, or generating, by the terminal, M pictures, and after the receiving, by the terminal, a first operation of a user, the terminal further performs the following operation: performing a screenshot operation on the first interface to obtain a second picture.

The generating, by the terminal, a first picture, or generating, by the terminal, M pictures includes: generating, by the terminal, the first picture based on the second picture, or generating, by the terminal, the M pictures based on the second picture.

In a possible implementation, the terminal further performs the following operation: obtaining the size and/or the location of the selected area in the N areas in the first interface.

The generating, by the terminal, the first picture based on the second picture, or generating, by the terminal, the M pictures based on the second picture includes: generating, by the terminal, the first picture based on the size and/or the location of the selected area in the N areas in the first interface and the second picture, or generating, by the terminal, the M pictures based on the size and/or the location of the selected area in the N areas in the first interface and the second picture.

In a possible implementation, the generating, by the terminal, the first picture based on the second picture includes: cropping, by the terminal, content of an unselected area in the N areas in the second picture, to obtain the first picture; or modifying, by the terminal, content of an unselected area in the N areas in the second picture to a preset pattern, to obtain the first picture.

In a possible implementation, the generating, by the terminal, the first picture based on the second picture further includes: separately cropping, by the terminal, content of selected areas in the N areas from the second picture, and synthesizing the content of the cropped areas to obtain the first picture.

In a possible implementation, before the generating, by the terminal, a first picture, or generating, by the terminal, M pictures, the terminal further performs the following operation: obtaining a cache of a decor view of an application corresponding to the selected area in the N areas.

The generating a first picture, or generating, by the terminal, M pictures includes: generating the first picture based on the cache of the decor view of the application corresponding to the selected area in the N areas, or generating the M pictures based on the cache of the decor view of the application corresponding to the selected area in the N areas.

In a possible implementation, the terminal further performs the following operation: obtaining the size and/or the location of the selected area in the N areas in the first interface.

The generating, by the terminal, the first picture based on the cache of the decor view of the application corresponding to the selected area in the N areas, or generating, by the terminal, the M pictures based on the cache of the decor view of the application corresponding to the selected area in the N areas includes:

generating, by the terminal, the first picture based on the cache of the decor view of the application corresponding to the selected area in the N areas and the size and/or the location of the selected area in the N areas in the first interface, or generating, by the terminal, the M pictures based on the cache of the decor view of the application corresponding to the selected area in the N areas and the size and/or the location of the selected area in the N areas in the first interface.

In a possible implementation, the second interface further includes N lock controls, the N lock controls are in a one-to-one correspondence with the N areas, and the lock control is used to lock or unlock content of a corresponding area. Before the receiving, by the terminal, a third operation of the user, the terminal further performs the following operations: receiving a fourth operation of the user, where the fourth operation is an operation on the N lock controls; and determining a locked area in the N areas in response to the fourth operation.

After the generating, by the terminal, a first picture in response to the third operation, the terminal further performs the following operations: displaying the first interface; receiving a fifth operation of the user; and displaying a third interface in response to the fifth operation, where a locked area in the N areas in the third interface is a selected area by default.

According to a third aspect, a computer storage medium is provided, including computer instructions. When the computer instructions are run on a terminal, the terminal is enabled to perform the method in any one of the first aspect or the possible implementations of the first aspect.

According to a fourth aspect, a computer program product is provided. When the computer program product is run on a computer, the computer is enabled to perform the method in any one of the first aspect or the possible implementations of the first aspect.

BRIEF DESCRIPTION OF DRAWINGS

FIG. 3A-1 and FIG. 3A-2 are a schematic diagram of some user interfaces of a mobile phone according to an embodiment of this application;

FIG. 3B-1 and FIG. 3B-2 are a schematic diagram of other user interfaces of a mobile phone according to an embodiment of this application;

FIG. 3C-1 to FIG. 3C-3 are a schematic diagram of other user interfaces of a mobile phone according to an embodiment of this application;

FIG. 3E-1 to FIG. 3E-3 are a schematic diagram of other user interfaces of a mobile phone according to an embodiment of this application;

FIG. 3F-1 and FIG. 3F-2 are a schematic diagram of other user interfaces of a mobile phone according to an embodiment of this application;

FIG. 3G-1 and FIG. 3G-2 are a schematic diagram of other user interfaces of a mobile phone according to an embodiment of this application;

FIG. 3H-1 and FIG. 3H-2 are a schematic diagram of other user interfaces of a mobile phone according to an embodiment of this application;

FIG. 4A-1 and FIG. 4A-2 are a schematic diagram of other user interfaces of a mobile phone according to an embodiment of this application;

FIG. 4B-1 and FIG. 4B-2 are a schematic diagram of other user interfaces of a mobile phone according to an embodiment of this application;

FIG. 4C-1 and FIG. 4C-2 are a schematic diagram of other user interfaces of a mobile phone according to an embodiment of this application; and FIG. 4D-1 and FIG. 4D-2 are a schematic diagram of other user interfaces of a mobile phone, according to an embodiment of this application.

DESCRIPTION OF EMBODIMENTS

The following describes the technical solutions in the embodiments of this application with reference to the accompanying drawings in the embodiments of this application. In descriptions of the embodiments of this application. "/" means "or" unless otherwise specified. For example, A/B may represent A or B. In this specification, "and/or" describes only an association for describing associated objects and represents that three relationships may exist. For example, A and/or B may represent the following three cases: Only A exists, both A and B exist, and only B exists.

The following terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the description of the embodiments of this application, unless otherwise specified, "a plurality of" means two or more than two.

In addition, in the embodiments of this application, the word "example" or "for example" is used to represent giving an example, an illustration, or a description. Any embodiment or design scheme described as the word "example" or "for example" in the embodiments of this application should not be explained as being more preferred or having more advantages than another embodiment or design scheme. Exactly, use of the word such as "example" or "for example" is intended to present a related concept in a specific manner.

For example, an electronic device in this application may be a mobile phone, a tablet computer, a personal computer (personal computer, PC), a personal digital assistant (personal digital assistant, PDA), a smartwatch, a netbook, a wearable electronic device, an augmented reality (augmented reality, AR) device, a virtual reality (virtual reality, VR) device, a vehicle-mounted device, a smart vehicle, a smart speaker, or a robot. A specific form of the electronic device is not specially limited in this application.

Figure 1:
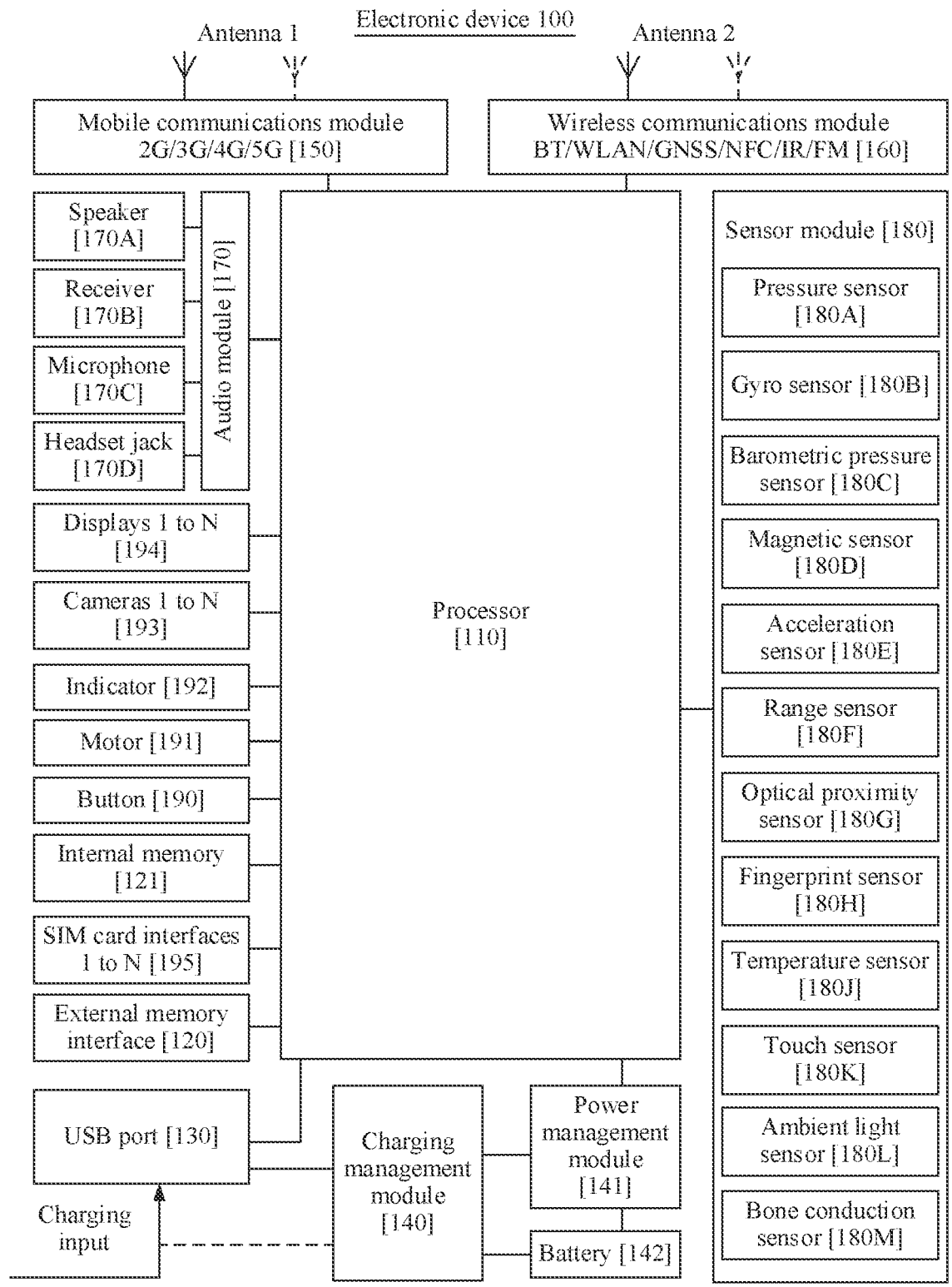
FIG. 1 is a schematic structural diagram 1 of an electronic device according to an embodiment of this application.

FIG. 1 is a schematic structural diagram of an electronic device 100.

The electronic device 100 may include a processor 110, an external memory interface 120, an internal memory 121, a universal serial bus (universal serial bus. USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural network processing unit (neural-network processing unit, NPU). Different processing units may be independent components, or may be integrated into one or more processors.

The controller may generate an operation control signal based on instruction operation code and a time sequence signal, to complete control of instruction reading and instruction execution.

A memory may be further disposed in the processor 110, and is configured to store an instruction and data. In some embodiments, the memory in the processor 110 is a cache memory. The memory may store an instruction or data just used or cyclically used by the processor 110. If the processor 110 needs to use the instruction or the data again, the processor 110 may directly invoke the instruction or the data from the memory. This avoids repeated access and reduces a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module. SIM) interface, a universal serial bus (universal serial bus. USB) interface, and/or the like.

The I2C interface is a two-way synchronization serial bus, and includes a serial data line (serial data line, SDA) and a serial clock line (derail clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K by using the I2C interface, so that the processor 110 communicates with the touch sensor 180K by using the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be configured to: perform audio communication, and sample, quantize, and code an analog signal. In some embodiments, the audio module 170 may be coupled to the wireless communications module 160 through a PCM bus interface. In some embodiments, the audio module 170 may alternatively transmit the audio signal to the wireless communications module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using the Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the electronic device 100. The processor 110 communicates with the display 194 by using the DSI interface, to implement a display function of the electronic device 100.

The GPIO interface may be configured through software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as the I2C interface, the I2S interface, the UART interface, the MIPI interface, or the like.

The USB port 130 is an interface that conforms to a USB standard specification, and may be specifically a mini USB port, a micro USB port, a USB Type-C interface, or the like. The USB port 130 may be configured to connect to the charger to charge the electronic device 100, may be configured to transmit data between the electronic device 100 and a peripheral device, or may be configured to connect to a headset, to play audio by using the headset. Alternatively, the port may be configured to connect to another electronic device, for example, an AR device.

It may be understood that an interface connection relationship between the modules that is shown in this embodiment of the present invention is merely an example for description, and does not constitute a limitation on a structure of the electronic device 100. In some other embodiments of this application, the electronic device 100 may alternatively use an interface connection manner that is different from that in the foregoing embodiment, or a combination of a plurality of interface connection manners.

The charging management module 140 is configured to receive a charging input from the charger. The charger may be a wireless charger, or may be a wired charger. In some embodiments of wired charging, the charging management module 140 may receive a charging input from the wired charger through the USB port 130. In some embodiments of wireless charging, the charging management module 140 may receive a wireless charging input by using a wireless charging coil of the electronic device 100. The charging management module 140 supplies power to the electronic device by using the power management module 141 while charging the battery 142.

The power management module 141 is configured to connect to the battery 142, the charging management module 140, and the processor 110. The power management module 141 receives an input of the battery 142 and/or an input of the charging management module 140, and supplies power to the processor 110, the internal memory 121, the display 194, the camera 193, the wireless communication module 160, and the like. The power management unit 141 may further be configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communications frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communications module 150 can provide a solution, applied to the electronic device 100, to wireless communication including 2G, 3G, 4G, 5G, and the like. The mobile communications module 150 may include at least one filter, a switch, a power amplifier, a low noise amplifier (low noise amplifier, LNA), and the like. The mobile communications module 150 may receive an electromagnetic wave by using the antenna 1, perform processing such as filtering and amplification on the received electromagnetic wave, and transfer a processed electromagnetic wave to a modem processor for demodulation. The mobile communications module 150 may further amplify a signal modulated by the modem processor, and convert the signal into an electromagnetic wave for radiation by using the antenna 1. In some embodiments, at least some functional modules in the mobile communications module 150 may be disposed in the processor 110. In some embodiments, at least some function modules of the mobile communication module 150 and at least some modules of the processor 110 may be disposed in a same device.

The modem processor may include a modulator and a demodulator. The modulator is configured to modulate a to-be-sent low-frequency baseband signal into an intermediate or high-frequency signal. The demodulator is configured to demodulate a received electromagnetic wave signal into a low-frequency baseband signal. Then, the demodulator transfers the low-frequency baseband signal obtained through the demodulation to the baseband processor for processing. The low-frequency baseband signal is processed by the baseband processor, and then transferred to the application processor. The application processor outputs a sound signal by using an audio device (not limited to the speaker 170A, the receiver 170B, and the like), or displays an image or a video by using the display 194. In some embodiments, the modem processor may be an independent device. In some other embodiments, the modem processor may be independent of the processor 110, and is disposed in a same device with the mobile communication module 150 or another function module.

The wireless communications module 160 may provide a solution, applied to the electronic device 100, to wireless communication including a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), infrared (infrared, IR) technology, and the like. The wireless communication module 160 may be one or more devices that integrate at least one communication processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation by using the antenna 2.

In some embodiments, in the electronic device 100, the antenna 1 and the mobile communications module 150 are coupled, and the antenna 2 and the wireless communications module 160 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLO-NASS), a BeiDou navigation satellite system (beidou navigation satellite system, BDS), a quasi-zenith satellite system (quasi-zenith satellite system, QZSS), and/or a satellite based augmentation system (satellite based augmentation systems, SBAS).

The electronic device 100 implements the display function through the GPU, the display 194, the application processor, and the like. The GPU is a microprocessor for image processing, and is connected to the display 194 and the application processor. The GPU is configured to perform mathematical and geometric calculation, and is used for graphics rendering. The processor 110 may include one or more GPUs that execute a program instruction to generate or change display information.

The display 194 is configured to display an image, a video, and the like. The display 194 includes a display panel. The display panel may use a liquid crystal display (liquid crystal display, LCD), an organic light-emitting diode (organic light-emitting diode, OLED), an active-matrix organic light emitting diode or an active-matrix organic light emitting diode (active-matrix organic light emitting diode, AMOLED), a flexible light-emitting diode (flex light-emitting diode, FLED), a miniLED, a microLED, a micro-OLED, a quantum dot light-emitting diode (quantum dot light emitting diodes, QLED), or the like. In some embodiments, the electronic device 100 may include one or N displays 194, where N is a positive integer greater than 1.

The electronic device 100 may implement the photographing function through the ISP, the camera 193, the video codec, the GPU, the display 194, the application processor, and the like.

The ISP is configured to process data fed hack by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in an RGB format, a YUV format, or the like. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy and the like.

The video codec is configured to: compress or decompress a digital video. The electronic device 100 may support one or more video codecs. Therefore, the electronic device 100 may play or record videos in a plurality of encoding formats, for example, MPEG (moving picture experts group, MPEG)-1, MPEG-2, MPEG-3, and MPEG-4.

The NPU is a neural-network (neural-network, NN) computing processor. The NPU quickly processes input information with reference to a structure of a biological neural network, for example, with reference to a transfer mode between human brain neurons, and may further continuously perform self-learning. Applications such as intelligent cognition of the electronic device 100 may be implemented by using the NPU, for example, image recognition, facial recognition, speech recognition, and text understanding.

The external memory interface 120 may be configured to connect to an external memory card, for example, a micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a sound playing function and an image playing function), and the like. The data storage area may store data (such as audio data and a phone book) created when the electronic device 100 is used, and the like. In addition, the internal memory 121 may include a high-speed random access memory, or may include a nonvolatile memory, for example, at least one magnetic disk storage device, a flash memory, or a universal flash storage (universal flash storage, UFS). The processor 110 runs the instructions stored in the internal memory 121 and/or the instructions stored in the memory disposed in the processor, to perform various function applications of the electronic device 100 and data processing.

The electronic device 100 may implement audio functions, for example, music playing and recording, by using the audio module 170, the speaker 170A, the receiver 170B, the microphone 170C, the headset jack 170D, the application processor. For example, the function may be music playing and recording.

The audio module 170 is configured to convert digital audio information into an analog audio signal for output, and is also configured to convert analog audio input into a digital audio signal. The audio module 170 may be further configured to: code and decode an audio signal. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. The electronic device 100 may be used to listen to music or answer a call in a hands-free mode over the speaker 170A.

The receiver 170B, also referred to as an "earpiece", is configured to convert an audio electrical signal into a sound signal. When a call is answered or audio information is listened to by using the electronic device 100, the receiver 170B may be put close to a human ear to listen to a voice.

The microphone 170C, also referred to as a "mike" or a "microphone", is configured to convert a sound signal into an electrical signal. When making a call or sending voice information, a user may make a sound by moving a human mouth close to the microphone 170C to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset interface 170D is configured to connect to a wired headset. The headset jack 170D may be a USB port 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180 is configured to sense a pressure signal, and can convert the pressure signal into an electrical signal. In some embodiments, the pressure sensor 180A may be disposed on the display 194. There are a plurality of types of pressure sensors 180A, for example, a resistive pressure sensor, an inductive pressure sensor, a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on an SMS message application icon, an instruction for creating a new SMS message is executed.

The gyro sensor 180B may be configured to determine a moving posture of the electronic device 100. In some embodiments, an angular velocity of the electronic device 100 around three axes (namely, axes x, y, and z) may be determined by using the gyro sensor 180B. The gyro sensor 180B may be configured to implement image stabilization during shooting. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may be further used in a navigation scenario and a motion-sensing game scenario.

The barometric pressure sensor 180C is configured to measure barometric pressure. In some embodiments, the electronic device 100 calculates an altitude by using the barometric pressure measured by the barometric pressure sensor 180C, to assist in positioning and navigation.

The magnetic sensor 180D includes a Hall sensor. The electronic device 100 may detect opening and closing a flip leather case by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking of the flip cover is set based on a detected opening/closing state of the smart cover or a detected opening/closing state of the flip cover.

The acceleration sensor 180E may detect accelerations in various directions (usually on three axes) of the electronic device 100, and may detect magnitude and a direction of gravity when the electronic device 100 is still. The acceleration sensor 180E may be further configured to identify a posture of the electronic device, and is used in an application such as switching between a landscape mode and a portrait mode or a pedometer.

The range sensor 180E is configured to measure a distance. The electronic device 100 may measure the distance in an infrared or a laser manner. In some embodiments, in a photographing scenario, the electronic device 100 may measure a distance by using the range sensor 180E to implement quick focusing.

The optical proximity sensor 180G may include, for example, a light-emitting diode (LED) and an optical detector such as a photodiode. The light-emitting diode may be an infrared light-emitting diode. The electronic device 100 emits infrared light by using the light emitting diode. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear to make a call, to automatically perform screen-off for power saving. The optical proximity sensor 180G may also be used in a smart cover mode or a pocket mode to automatically unlock or lock the screen.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during shooting. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based shooting, fingerprint-based call answering, and the like.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is lower than another threshold, the electronic device 100 heats the battery 142 to prevent the electronic device 100 from being shut down abnormally because of a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a "touch control device". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor 180K. The touch sensor may transfer the detected touch operation to the application processor, to determine a type of a touch event. The display 194 may provide a visual output related to the touch operation. In some other embodiments, the touch sensor 180K may also be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human voice part. The bone conduction sensor 180M may also be in contact with a human pulse, and receive a blood pressure beating signal. In some embodiments, the bone conduction sensor 180M may alternatively be disposed in a headset, to form a bone conduction headset. The audio module 170 may obtain a voice signal through parsing based on the vibration signal that is of the vibration bone of the voice part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to user settings and function control of the electronic device 100.

The motor 191 may generate a vibration prompt. The motor 191 may be configured to provide an incoming call vibration prompt or a touch vibration feedback. For example, touch operations performed on different applications (for example, photographing and audio play) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted in a same SIM card interface 195. The plurality of cards may be of a same type, or may be of different types. The SIM card interface 195 may also be compatible with different types of SIM cards. The SIM card interface 195 may also be compatible with the external storage card. The electronic device 100 interacts with a network by using the SIM card, to implement functions such as conversation and data communication. In some embodiments, the electronic device 100 uses an eSIM namely, an embedded SIM card. The eSIM card may be embedded in the electronic device 100, and cannot be separated from the electronic device 100.

A software system of the electronic device 100 may use a layered architecture, an event-driven architecture, a microkernel architecture, a micro service architecture, or a cloud architecture. In this embodiment of this application, an Android system of a layered architecture is used as an example to illustrate a software structure of the electronic device 100.

Figure 2:
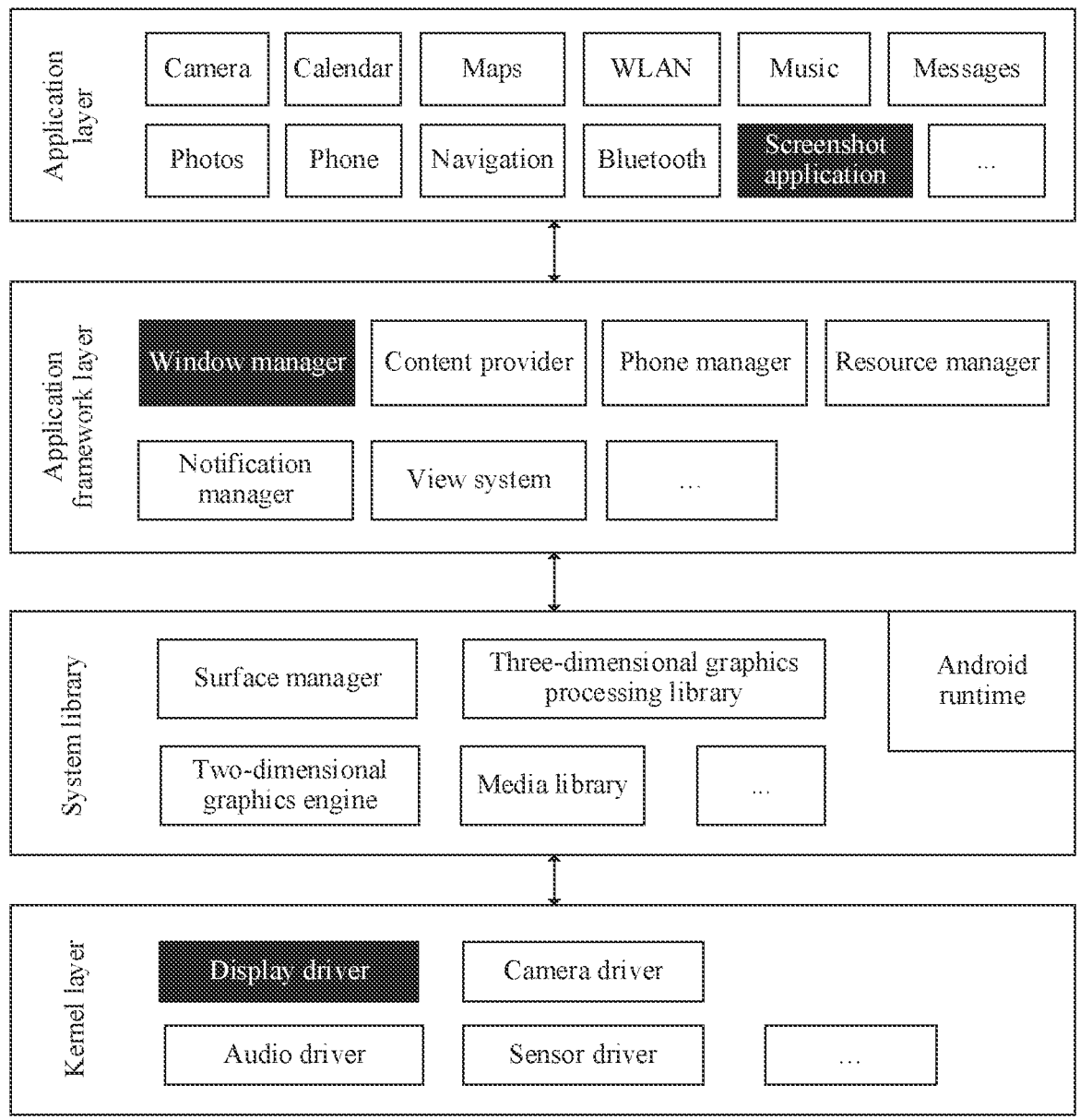
FIG. 2 is a schematic structural diagram 2 of an electronic device according to an embodiment of this application.

FIG. 2 is a block diagram of a software structure of the electronic device 100 according to an embodiment of the present invention.

In a hierarchical architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 2, the application packages may include applications such as Camera, Gallery, Calendar, Phone, Maps, Navigation, WLAN, Bluetooth, Music, Videos, and Messages.

In some embodiments of this application, the application package may further include a screenshot application, for example, SystemUI. The screenshot application may be used to draw a screenshot preview image, and specifically to: draw a screenshot obtained by capturing a current entire screen, that is, a first screenshot, and crop, synthesize, and modify the first screenshot to generate a second screenshot including a part of an application window on the current screen, and the like.

The application framework layer provides an application programming interface (application programming interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, lock a screen, take a screenshot, and the like.

In some embodiments of this application, the window manager may be specifically a window management service (WindowManagerService, WMS). The WMS stores information about each application window displayed on the current screen, for example, information such as coordinates and a size of each application window.

When an application at the application layer starts running, the WMS is notified of information such as a size and a location of a started application window. In addition, when the size and the location of the application window change subsequently, the changed data is also updated to the WMS in time. Therefore, the information about each application window displayed on the current screen may be obtained from the WMS.

The content provider is configured to: store and obtain data, and enable the data to be accessed by an application. The data may include a video, an image, audio, calls that are made and received, a browsing history and a bookmark, a phone book, and the like.

The view system includes visual controls such as a control for displaying a text and a control for displaying a picture. The view system may be configured to construct an application. A display interface may include one or more views. For example, a display interface including a Messages notification icon may include a text display view and a picture display view.

The phone manager is configured to provide a communications function of the electronic device 100, for example, management of a call status (including answering, declining, or the like).

The resource manager provides various resources for an application, such as a localized character string, an icon, a picture, a layout file, and a video file.

The notification manager enables an application to display notification information a status bar, and may be configured to convey a notification message. The notification manager may automatically disappear after a short pause without requiring a user interaction. For example, the notification manager is configured to: notify download completion, give a message notification, and the like. The notification manager may alternatively be a notification that appears in a top status bar of the system in a form of a graph or a scroll bar text, for example, a notification of an application running on the background or a notification that appears on a screen in a form of a dialog window. For example, text information is displayed in the status bar, a prompt tone is played, the electronic device vibrates, or an indicator light blinks.

The Android runtime includes a kernel library and a virtual machine. The Android runtime is responsible for scheduling and management of the Android system.

The kernel library includes two parts: a function that needs to be invoked in java language and a kernel library of Android.

The application layer and the application framework layer run on the virtual machine. The virtual machine executes java files at the application layer and the application framework layer as binary files. The virtual machine is configured to perform functions such as object lifecycle management, stack management, thread management, security and exception management, and garbage collection.

The system library may include a plurality of function modules such as for example, a surface manager (surface manager), a media library (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports play and recording in a plurality of commonly used audio and video formats, static image files, and the like. The media library may support a plurality of audio and video coding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver, The following describes an example of a working process of software and hardware of the electronic device 100 with reference to a screenshot scenario.

When the touch sensor 180K receives a touch operation, a corresponding hardware interrupt is sent to the kernel layer. The kernel layer processes the touch operation into an original input event (including information such as touch coordinates and a time stamp of the touch operation). The original input event is stored at the kernel layer. The application framework layer obtains the original input event from the kernel layer, and identifies a control corresponding to the input event. For example, the touch operation is a single-tap operation, and a control corresponding to the single-tap operation is a screenshot control of a drop-down notification bar. The screenshot application invokes an interface of the application framework layer to capture pixel values of pixels of the current entire screen, and draw a screenshot of the entire screen. Further, the display driver is started by invoking the kernel layer, and a corresponding interface is displayed on the display 194.

All technical solutions included in the following embodiments can be implemented in the electronic device 100 having the foregoing hardware architecture and software architecture. The following provides a description by using an example in which the electronic device is a mobile phone, FIG. 3A-1 and FIG. 3A-2 to FIG. 3H-1 and FIG. 3H-2 are schematic diagrams of some interfaces of a mobile phone. The following describes in detail a method for performing a screenshot operation on some application windows in an interface provided in an embodiment of this application with reference to the accompanying drawings.

Figures 1, 3A:
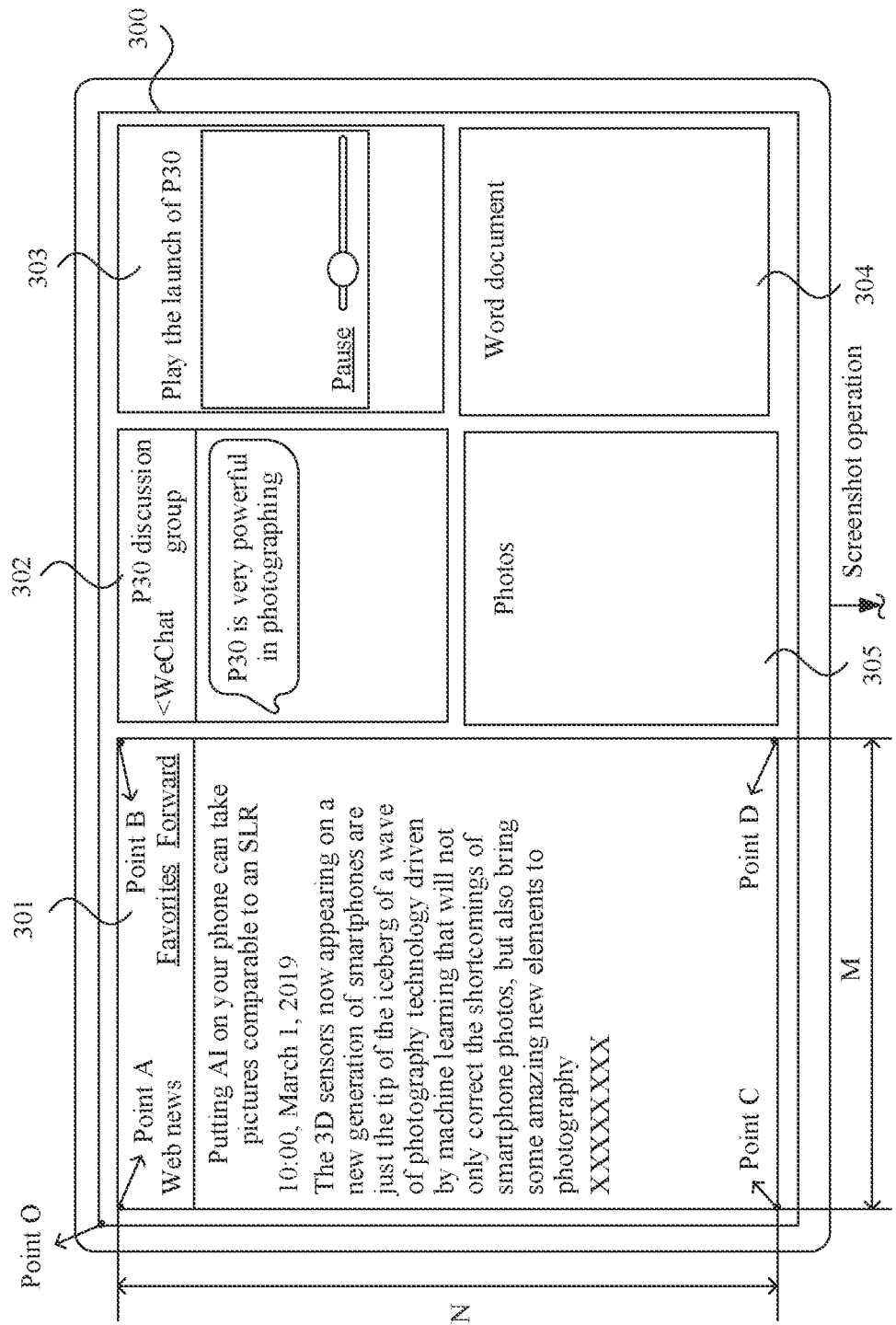

As a screen of a mobile phone increases, and in particular, a foldable mobile phone appears, a user may use the mobile phone to start a plurality of applications, and perform an operation on the plurality of applications in one display interface (that is, a first interface) of the screen. As shown in FIG. 3A-1 and FIG. 3A-2, an interface 300 is an example of the first interface, and windows of a plurality of applications are displayed in the interface 300, for example, a window 301 of a browser application, a chat window 302 of a WeChat application, a window 303 of a video application, a window 304 of a document application, and a window 305 of a photo application.

In response to detecting a screenshot operation, the mobile phone may capture a screenshot of the entire screen (that is, a screenshot of the first interface, a first screenshot for short). In addition, the mobile phone obtains information about each application window on the current screen (that is, the first interface), for example, information such as an identifier of each application, and a size and coordinates of each application window. In this way, the mobile phone may determine a display area of each application window on the screen, that is, a location of each application window on the screenshot of the entire screen (that is, the first screenshot).

In a specific implementation, in response to detecting the screenshot operation, a screenshot application or function in the mobile phone may invoke SurfaceControl.screenshot to capture the screenshot of the entire screen, that is, the first screenshot. In addition, the screenshot application or function invokes a window management service at an application framework layer to obtain information such as a size and coordinates of each application window. The screenshot application or function associates the first screenshot with the display area of each application window, for example, draws a control associated with each application window on the first screenshot. Subsequently, the screenshot application determines, based on an operation performed by the user on the control, to retain or remove some application windows on the first screenshot, and generates a final screenshot, that is, a second screenshot. Then, the second screenshot is saved in a gallery application.

Certainly, after detecting the screenshot operation, the mobile phone may alternatively obtain, by invoking the WMS, the information about each application window displayed on the current screen, and establish a control that is in a one-to-one correspondence with each application window displayed on the current screen. Then, the user selects, through the control, an application window that needs to be retained on the final screenshot. Next, the mobile phone determines a location, on the first screenshot, of the application window that needs to be retained, and obtains, from the first screenshot, content of the application window that needs to be retained. In this case, the mobile phone may capture the screenshot of the first interface (that is, the first screenshot) at any moment between a moment for detecting the screenshot operation and a moment for determining the location, on the first screenshot, of the application window that needs to be retained. In other words, a time for capturing the screenshot of the first interface is not limited in this embodiment of this application.

The screenshot operation may be, for example, an operation that the user presses a physical key (for example, presses a power key and a volume key simultaneously), or an operation that the user executes a predefined gesture, (for example, swipes three fingers down on the screen, or taps the screen with a knuckle), or an operation that the user operates a corresponding button on the screen (for example, taps a screenshot control in a notification bar). The screenshot operation is not specifically limited in this embodiment of this application.

When the display area of each application window on the screen is determined, the display area on the screen may be represented by using coordinates of four vertices of each application window, or may be represented by using coordinates of one vertex and a size of the application window. The display area of each application window on the screen may alternatively be represented in another manner. This is not specifically limited in this application.

For example, when the screen of the mobile phone is placed forward, for example, a coordinate system uses an upper left vertex (for example, a point O) of the screen as an origin, a direction parallel to an upper edge of the screen and pointing from a left edge to a right edge of the mobile phone is a positive direction of an X axis, and a direction parallel to a left edge of the screen and pointing from a top edge to a bottom edge of the mobile phone is a positive direction of a Y axis. A unit of the coordinate system may be a pixel unit, or may be a physical unit (for example, mm), or may be another unit. This is not specifically limited in this embodiment of this application.

A display area of an application window on the screen may be represented by using coordinates of four vertices. For example, the window of the browser application may be represented by using coordinates of an upper left vertex (a point A), coordinates of an upper right vertex (a point B), coordinates of a lower left vertex (a point C), and coordinates of a lower right vertex (a point D). A manner of representing a display area of another application window is similar, and details are not described. Alternatively, a display area of an application window on the screen may be represented by using one vertex and a size of the window. For example, the window of the browser application may be represented by using coordinates of an upper left vertex (a point A) and a size of the window (for example, M×N). A manner of representing a display area of another application window is similar, and details are not described.

It should be noted that the origin of the coordinate system may be alternatively any other point on the screen, for example, a center of the screen, and the directions of the X axis and the Y axis may be alternatively other directions. The coordinate system is not limited in this embodiment of this application.

After the display area of each application window on the screen is determined, a display area of each application window may also be determined on the screenshot of the entire screen (that is, the first screenshot). Then, the display area of each application window is associated with a corresponding control. In this way; the user may perform corresponding selection in the display area of each application window by operating the control, for example, select to retain a display area of an application window on the first screenshot, or select to remove a display area of an application window from the first screenshot. That is, in this application, based on selection by the user, the mobile phone may retain, on the screenshot of the entire screen, content of an application window that the user wants to display, or remove, from the screenshot of the entire screen, content of an application window that the user does not want to display. In other words, this application quickly takes a screenshot of a specific area on the entire screen.

In some embodiments, after the screenshot of the entire screen (that is, the first screenshot) is captured, the first screenshot (that is, a second interface) may be displayed on the screen, and some controls associated with each application window are displayed on the second interface, for example, a select control and a delete control. The select control may be used to select an application window, that is, select an application window that needs to be retained on the final screenshot. The delete control may be used to deselect an application window, that is, select an application window that does not need to be retained on the final screenshot. In this way, the user may directly operate the control corresponding to each application window, to select content of an application window that needs to be retained on the final screenshot, or select content of an application window that needs to be deleted on the final screenshot. Optionally, when displaying the second interface, the mobile phone may pinch the first screenshot in an appropriate proportion, so that the user can distinguish between the first interface and the second interface. Optionally, when the mobile phone captures the first screenshot, the mobile phone may also play a prompt tone such as a photographing tone, to notify the user that a screenshot operation has been performed on the first interface.

The control associated with each application window may be displayed on the display area of each application window, or may be displayed around the display area of each application window. Alternatively, the control may be displayed in another area in a list form. A display manner, a location, and the like of the control are not limited in this embodiment of this application.

For example, as shown in FIG. 3A-1 and FIG. 3A-2, an interface 306 is an example of the second interface. A pinched first screenshot 307 is displayed in the interface 306A. On the pinched first screenshot 307, a display area of each application window is also appropriately reduced. In addition, a control corresponding to each application window is further displayed in the interface 306. In some examples, after capturing the screenshot of the first interface, the mobile phone may also consider, by default, that each application in the first interface is not selected, that is, consider, by default, that the user does not retain content of any application window on the final screenshot. Then, the user may select content of an application window that the user wants to retain by tapping a select control. In some other examples, after capturing the screenshot of the first interface, the mobile phone may consider, by default, that each application in the first interface is selected, that is, consider, by default, that the user wants to retain content of each application window on the final screenshot. Then, the user may select to remove a window of an application by tapping a delete control.

For example, a delete control 308 is displayed in a display area corresponding to the document application. When the mobile phone detects that the user taps the delete control 308, the mobile phone displays the display area in which the window of the document application is located in a color such as gray that can be used to distinguish between the document application and another application window. Alternatively, the window of the document application may be displayed in another manner that can be used to distinguish between the document application and another application window. This indicates that the user selects to remove the content of the application window from the final screenshot, that is, the content of the application window is not displayed on the final screenshot.

Optionally, other controls may be further displayed in the interface 306, for example, a merge control 311, a separate control 310, an invert control 312, and an edit control 313. The more control 311 is used to indicate to display content of windows of a plurality of selected applications on one screenshot (that is, one picture). In an embodiment, the windows of the plurality of applications do not overlap on the screenshot. That is, the merge control 311 is used to implement a merge display function of the content of the windows of the plurality of selected applications. The function is referred to as a merge function hereinafter. The separate control 310 is used to indicate to display content of windows of a plurality of selected applications on a plurality of screenshots (that is, a plurality of pictures). For example, content of a window of only one application is displayed on each screenshot. That is, the separate control 310 is used to implement a separate display function of the content of the windows of the plurality of selected applications. The function is referred to as a separate function hereinafter. The revert control 312 is used to quickly switch an application on the current screenshot from a selected state to an unselected state, and switch an application on the current screenshot from an unselected state to a selected state. The edit control 313 is used to indicate to edit the current screenshot, and an operation such as cropping, graffiti, mosaic, or forwarding may be performed on the current screenshot.

Figures 1, 3B:
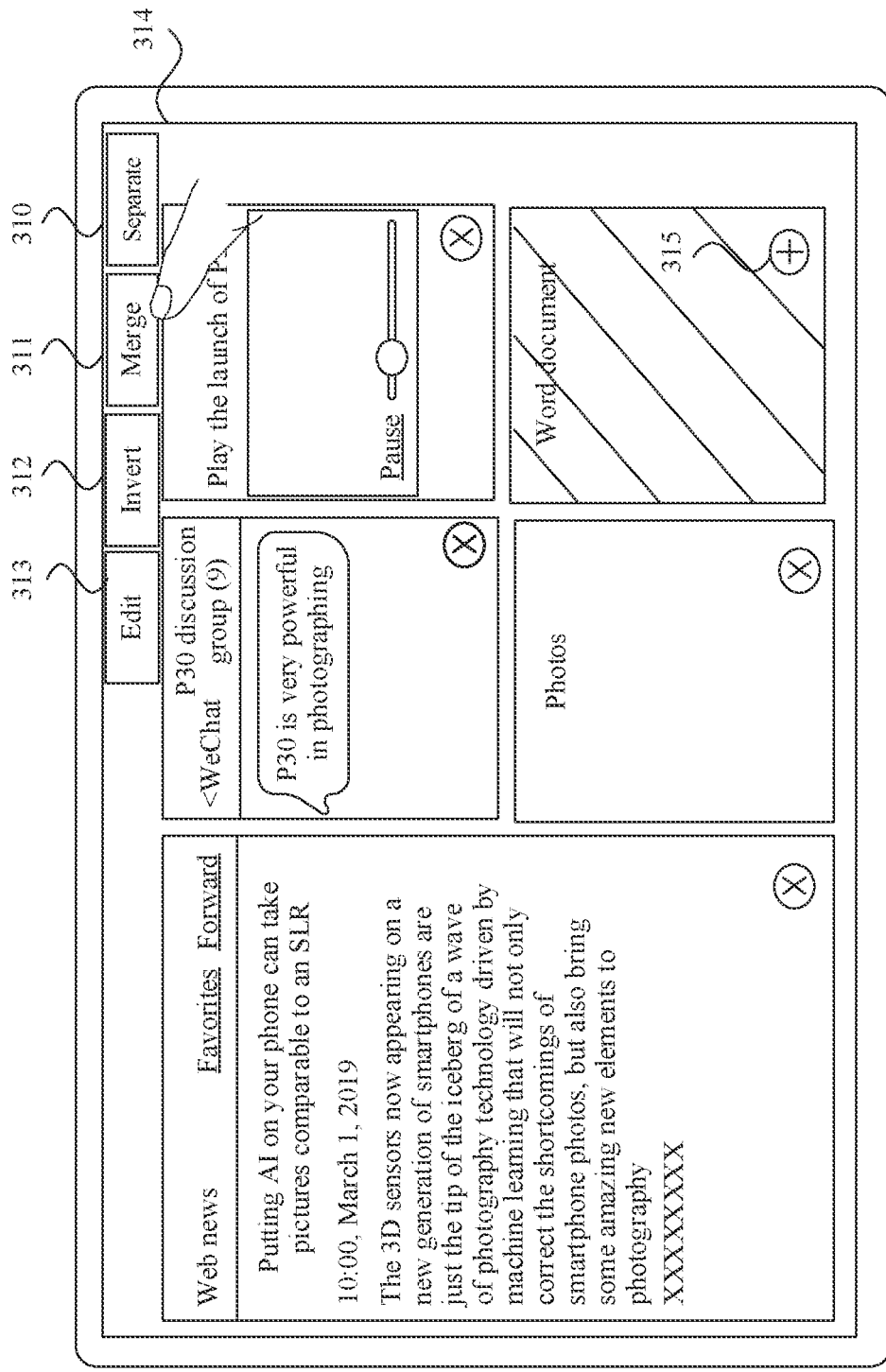
Figures 2, 3B:
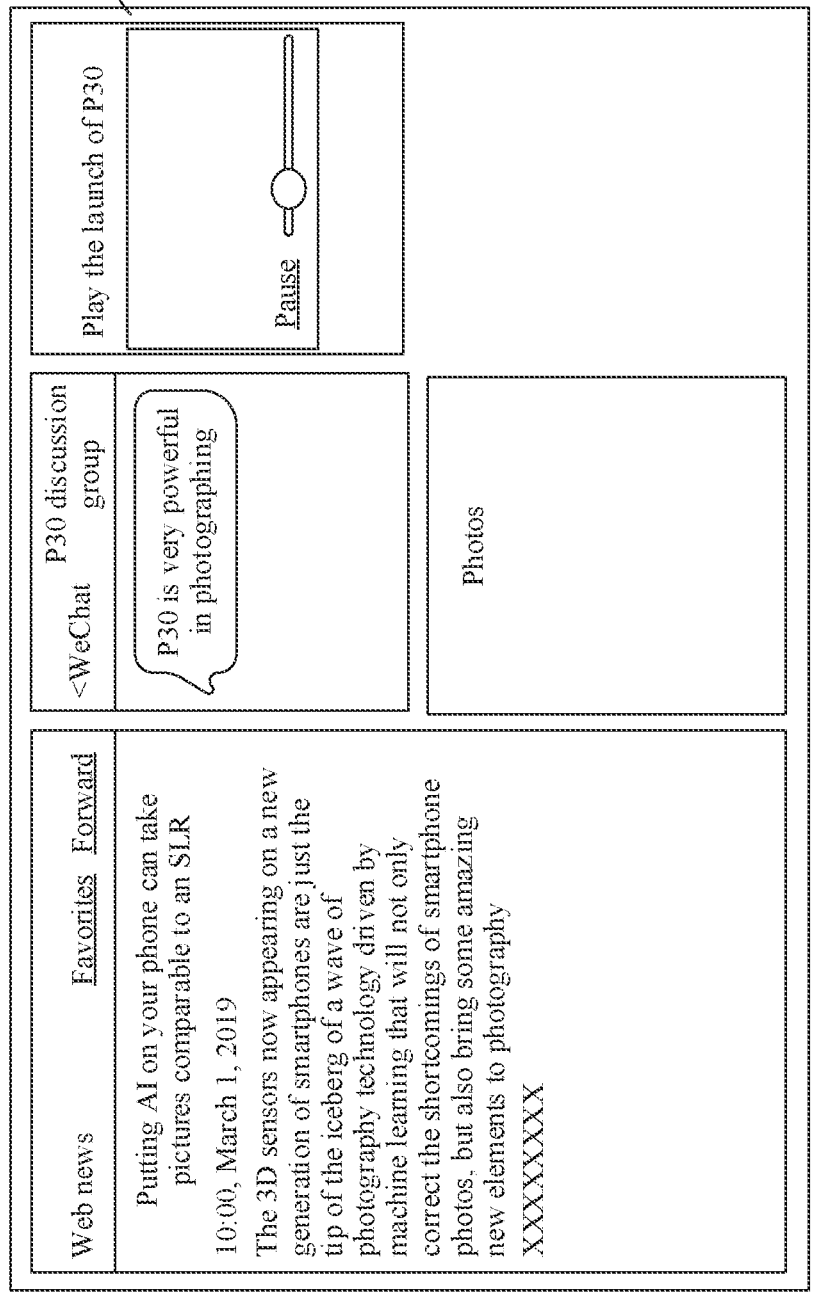

As shown in FIG. 3B-1 and FIG. 3B-2, an interface 314 is an interface displayed after the mobile phone detects that the user taps the delete control 308. It can be learned that a display manner of the window of the document application corresponding to the delete control 308 is different from a display manner of a window of another application, and distinguishing is performed by using shade in the figure. Optionally, a selected application window that is to be deleted may also be associated with an add control, for example, an add control 315, so that the user adds the application window back by using the add control, that is, displays content of the application window on the final screenshot.

Optionally, after application windows to be displayed are selected (or application windows not to be displayed are selected), the selected application windows may be all displayed on one screenshot, or the selected application windows may be separately displayed on a plurality of screenshots. That is, the merge function or the separate function is selected.

First, the merge function is described.

In the second interface, if it is detected that the user taps the merge control 311, the mobile phone generates a final screenshot (that is, a second screenshot) based on the current selection by the user. The second screenshot displays content of a plurality of application windows that the user currently selects to display. A size of the second screenshot is the same as a size of the first screenshot, and a size of each application window on the second screenshot is also the same as a size of a corresponding application window on the first screenshot.

For example, when the second interface is the interface 314, in the interface 314, after the user selects to delete the window of the document application, the mobile phone generates the second screenshot in response to detecting that the user taps the merge control 311. The second screenshot includes a window of a browser application, a chat window of WeChat, a play window of a video application, and a window of a gallery application. As shown in FIG. 3B-1 and FIG. 3B-2, a picture 316 is an example of the second screenshot generated by the mobile phone. The screenshot does not display content of an application window (that is, the window of the document application) that the user selects to remove. In a specific implementation, a pixel value of a display area of an application window (for example, the window of the document application) that the user selects to remove from the first screenshot may be modified, so that the display area is displayed in a specific pattern such as black, gray, white, or mosaic. This is not specifically limited in this embodiment of this application.

It should be noted that, when content of a plurality of application windows is displayed on the second screenshot, an original location of each application window may be retained, that is, a display area of each application window remains unchanged. That is, a size of the second screenshot is the same as a size of the first interface, and a location of each application window in the second screenshot is the same as a location of each application window in the first interface. In another specific implementation, the mobile phone may automatically crop, from the first screenshot based on selection by the user, an application window that is in the first screenshot and that the user does not select to retain (or an application window that the user selects to remove), to obtain the second screenshot. That is, a size of the second screenshot is less than a size of the first interface. However, a relative location of each application in the second screenshot is the same as a relative location of each application in the first interface.

Optionally, the mobile phone may alternatively automatically adjust a location of an application window, so that a layout of each application window in the second screenshot is more compact and beautiful. This facilitates subsequent other processing on the second screenshot, for example, cropping or compression. The user may alternatively manually move a location of an application window through dragging or the like. A method for adjusting a location of an application window is not specifically limited in this embodiment of this application. In a specific implementation, the mobile phone may automatically crop, based on selection by the user, application windows that the user selects to retain, and then rearrange, based on a size of the screen, locations of the cropped application windows, to obtain the second screenshot through synthesis. That is, a size of each application window in the second screenshot is the same as a size of each application window in the first interface, but a location of each application window in the second screenshot is different from a location of each application window in the first interface. Optionally, the mobile phone may alternatively rearrange locations and sizes of cropped application windows based on a size of the screen, to obtain the second screenshot through synthesis. That is, a size and a location of each application window in the second screenshot are different from a size and a location of each application window in the first interface.

Figures 1, 3C:
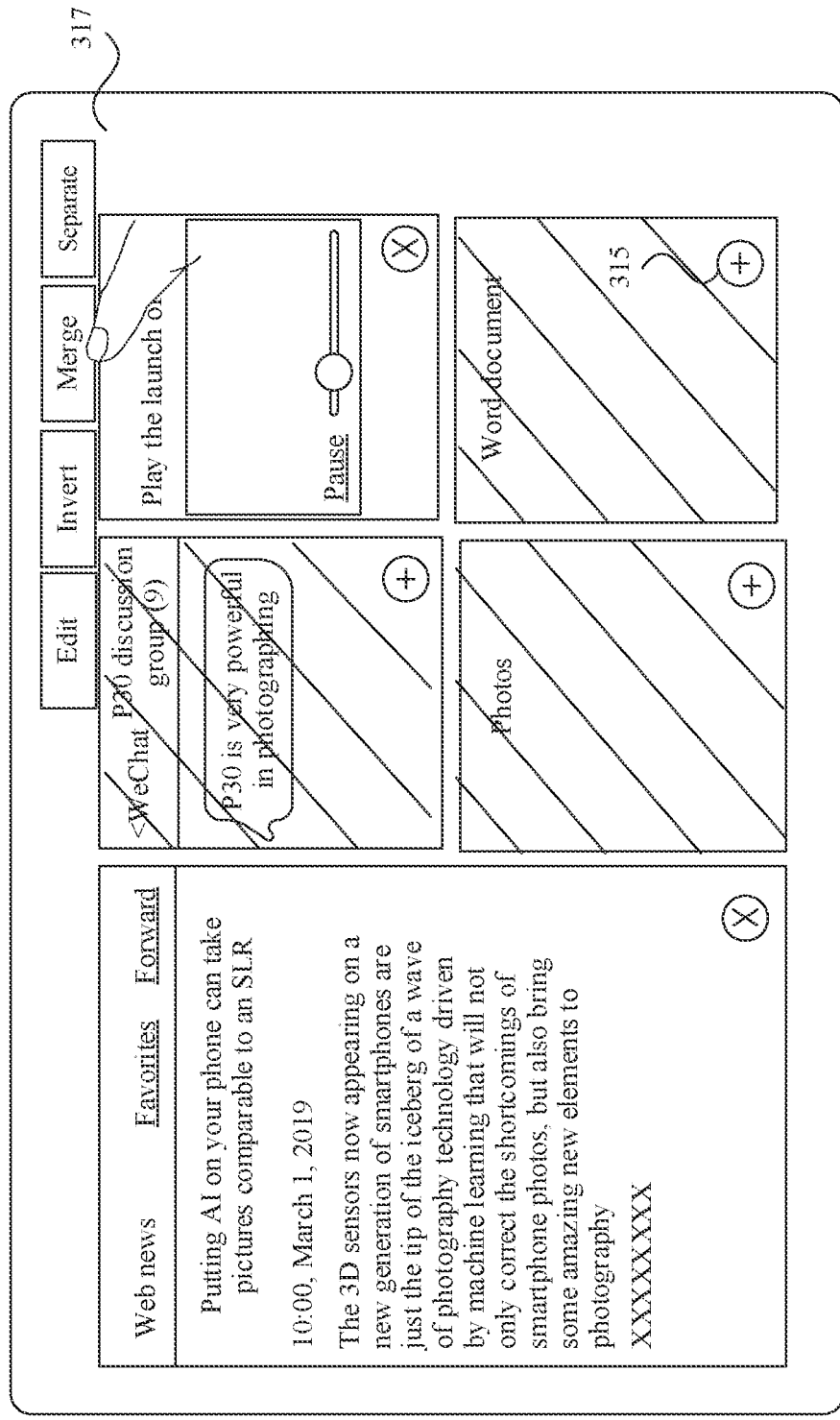
Figure 3D:
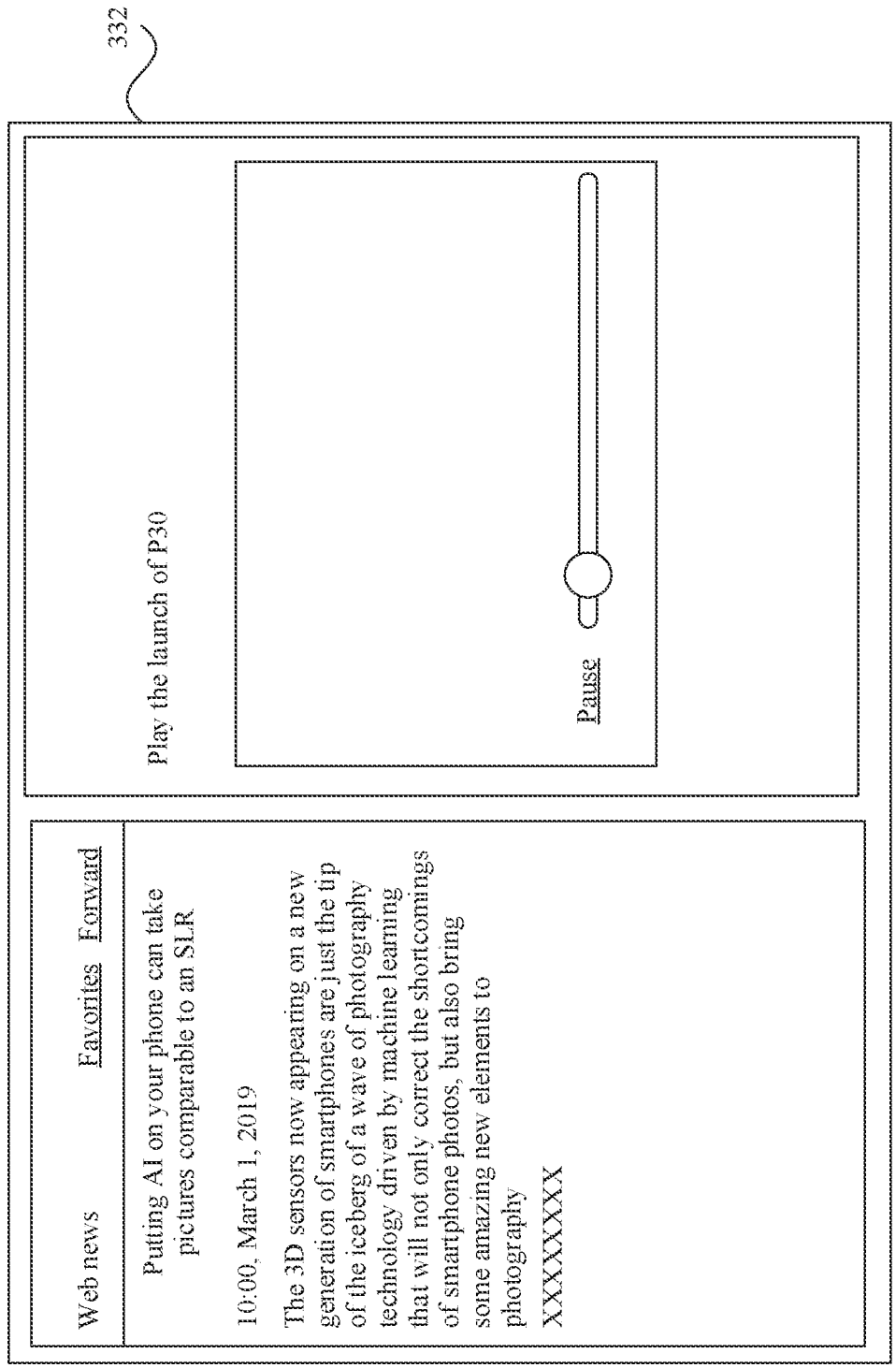
FIG. 3D is a schematic diagram of other user interfaces of a mobile phone according to an embodiment of this application.
Figures 1, 3E:
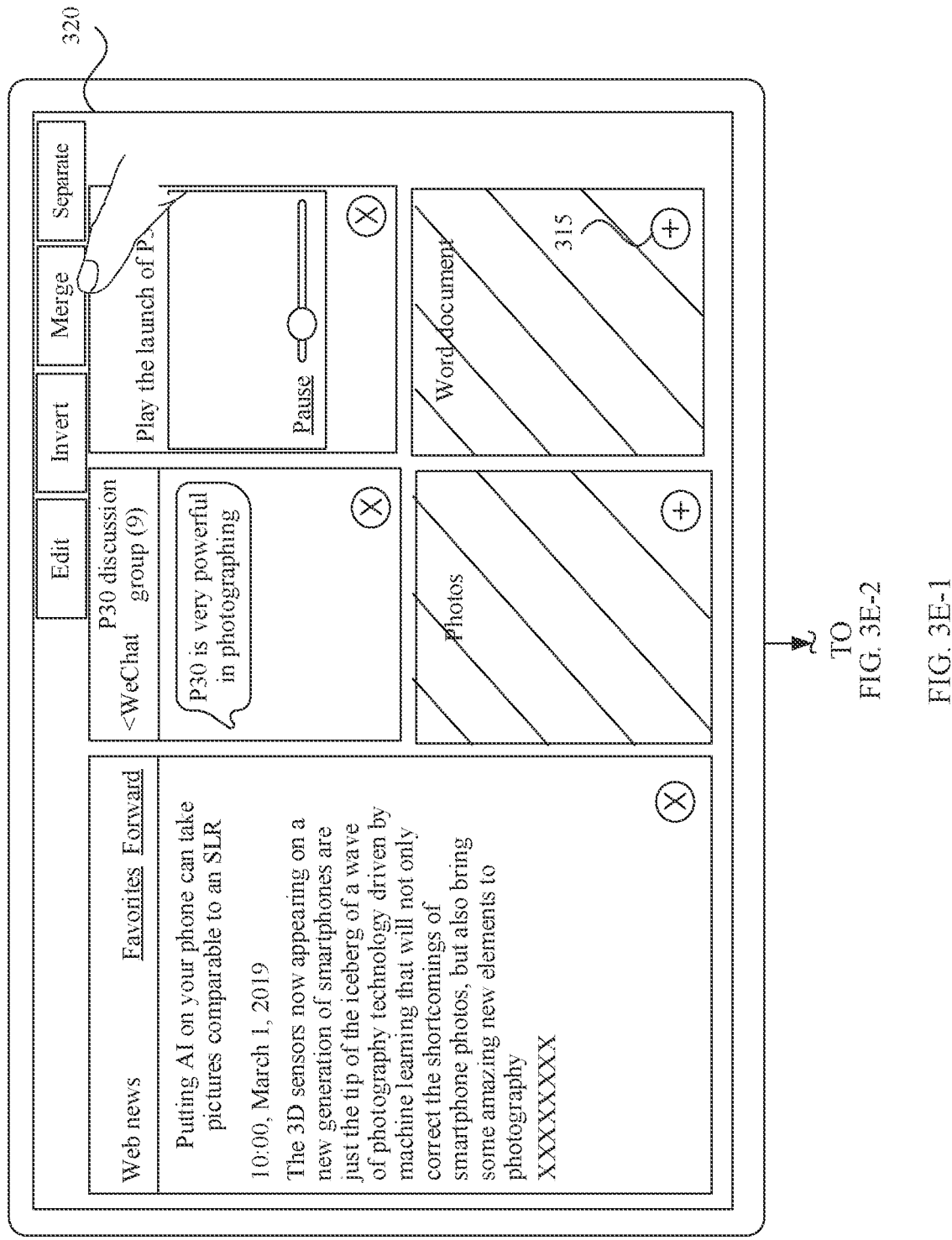
Figures 3, 3E:
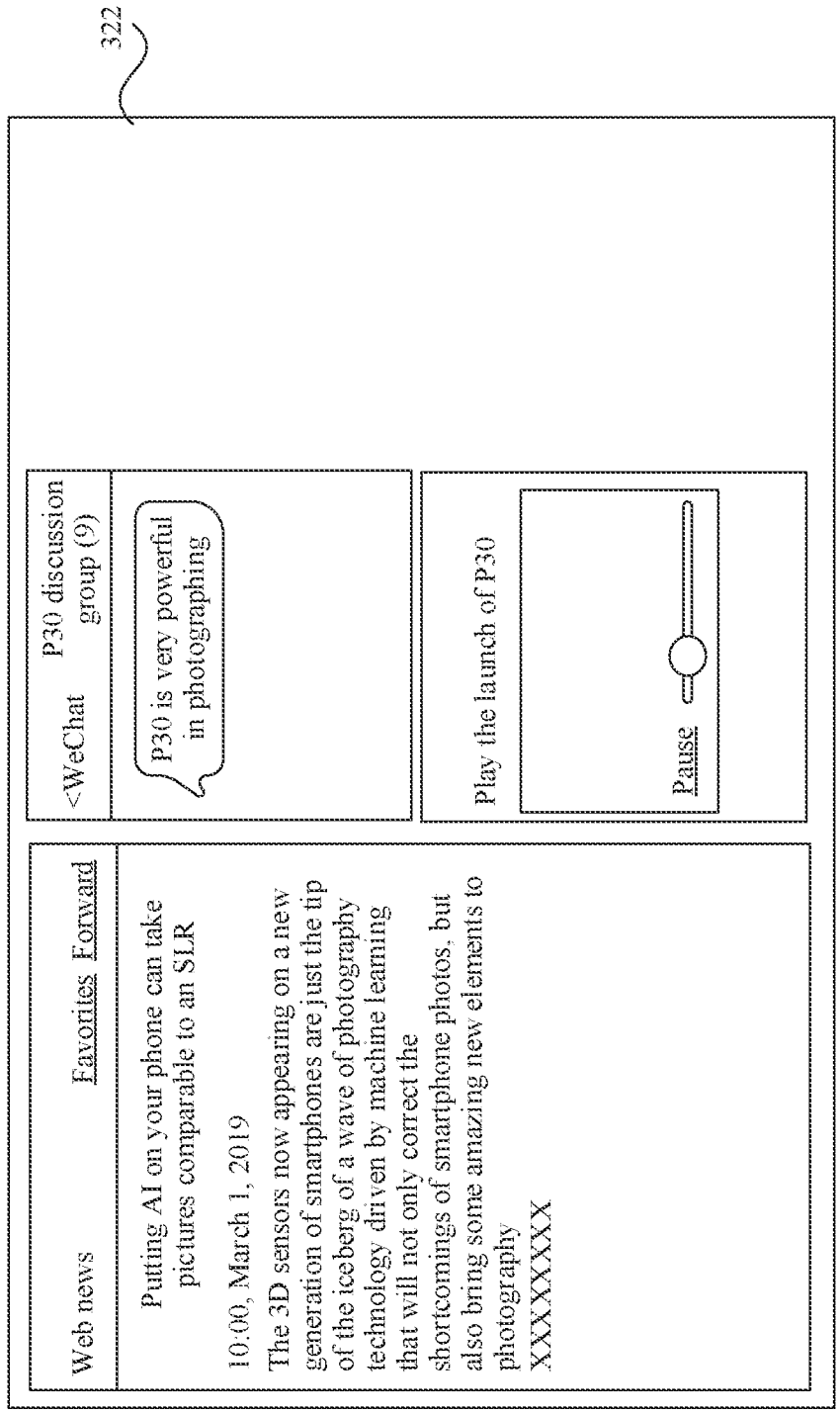

For example, as shown in FIG. 3C-1 to FIG. 3C-3, application windows that the user selects to retain in an interface 317 include a window of a browser application and a play window of a video application. In this case, after detecting that the user taps the merge control, the mobile phone generates the second screenshot that includes content of a plurality of application windows. The second screenshot may be, for example, a picture 318. That is, a location of each application window in the second screenshot is the same as a size and a location of a corresponding application window in the first screenshot. The second screenshot may be alternatively, for example, a picture 319. That is, a size of each application window in the second screenshot is the same as a size of a corresponding application window in the first screenshot, but locations of some application windows in the second screenshot may be different from locations of corresponding application windows in the first screenshot, that is, locations of some application windows are adjusted. For example, application windows that are not previously connected are displayed together, so that a layout of each application window in the second screenshot is more compact. Optionally, the mobile phone may alternatively automatically crop an area in which no application window is displayed in the second screenshot. That is, a size of the second screenshot is less than that of the first screenshot. The second screenshot may be alternatively, for example, a picture 332 shown in FIG. 3D, that is, locations and sizes of some application windows are adjusted. For example, a length and a width of the window of the video application are enlarged in a specific proportion, so that arrangement of each application window in the second screenshot is more compact and beautiful.

For another example, as shown in FIG. 3E-1 to FIG. 3E-3, application windows that the user selects to retain in the interface 320 include a window of a browser application, a chat window of WeChat, and a play window of a video application. In this case, after detecting that the user taps the merge control, the mobile phone generates the second screenshot that includes content of a plurality of application windows. The second screenshot may be, for example, a picture 321. In the picture 321, each application window retains a location of the application window in the first screenshot. The second screenshot may be alternatively, for example, a picture 322. In the picture 322, locations of some application windows are adjusted, so that a layout in the second screenshot is more compact. This facilitates subsequent other processing on the second screenshot, for example, cropping or compression. Optionally, the mobile phone may alternatively automatically crop an area in which no application window is displayed in the second screenshot. That is, a size of the second screenshot is less than that of the first screenshot.

Then, the separate function is described.

In the second interface, if it is detected that the user taps the separate control 310, the mobile phone generates a plurality of second screenshots based on the current selection by the user. Each second screenshot displays content of only one application window selected by the user. Optionally, a size of each second screenshot is less than a size of the first screenshot.

Figures 1, 3F:
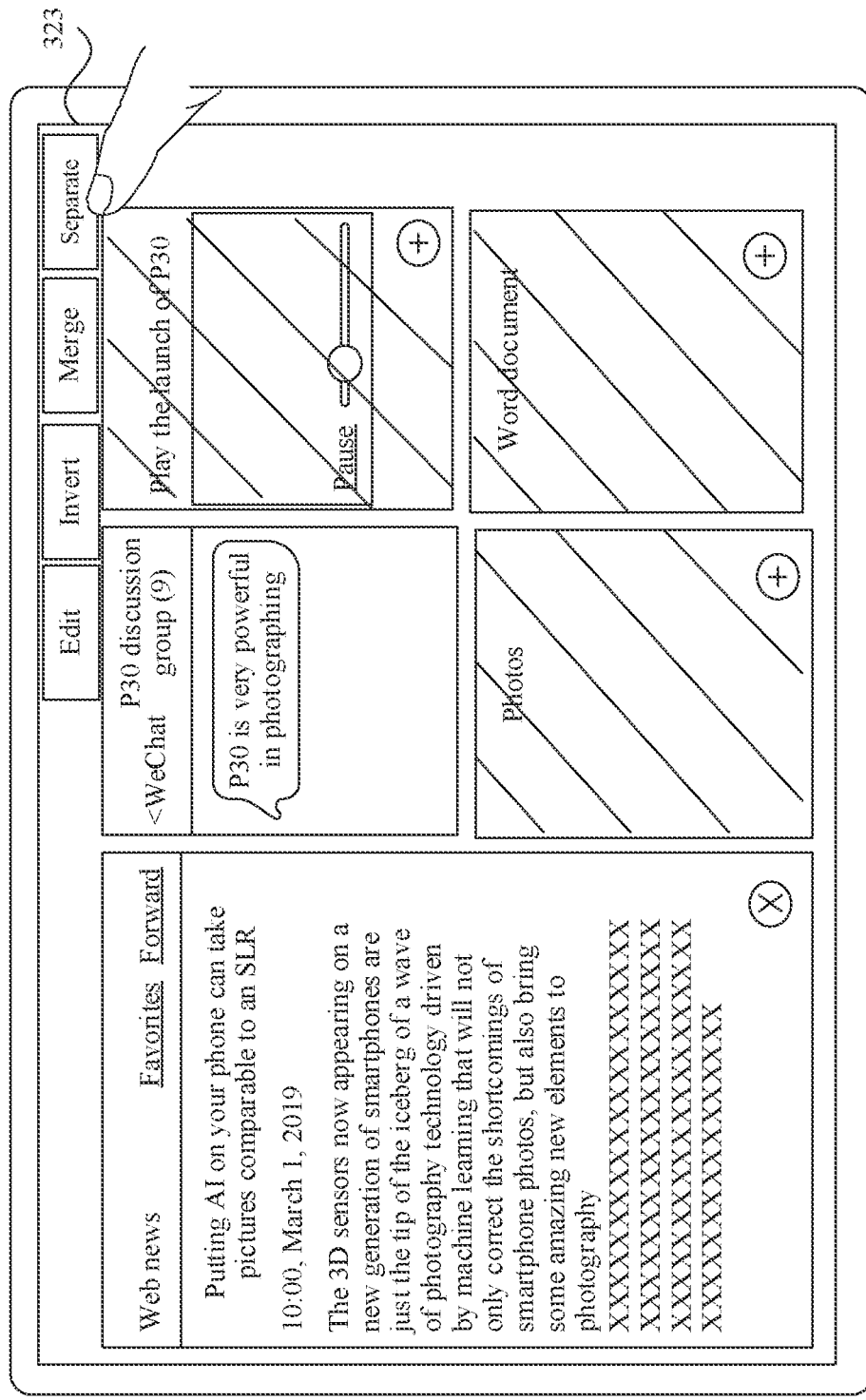

For example, as shown in FIG. 3F-1 and FIG. 3F-2, an interface 323 is an example of the second interface. Application windows that the user selects to display in the second screenshot include a window of a browser application and a chat window of a WeChat application. In response to detecting that the user taps the separate control 310, the mobile phone automatically generates two second screenshots, for example, a picture 324 and a picture 325. The picture 324 displays the window of the browser application, and a size of the picture 324 is consistent with a size of the window of the browser application. The picture 325 displays the chat window of the WeChat application, and a size of the picture 325 is consistent with a size of the chat window of the WeChat application.

In some other embodiments, the separate function may be further used in combination with a screen scrolling function. For example, the second interface may further display a scroll control associated with each application. That is, scrolling screenshot may be performed on an application window with a screen scrolling function selected, to obtain a screenshot of an entire interface of the application window.

Figures 1, 3G:
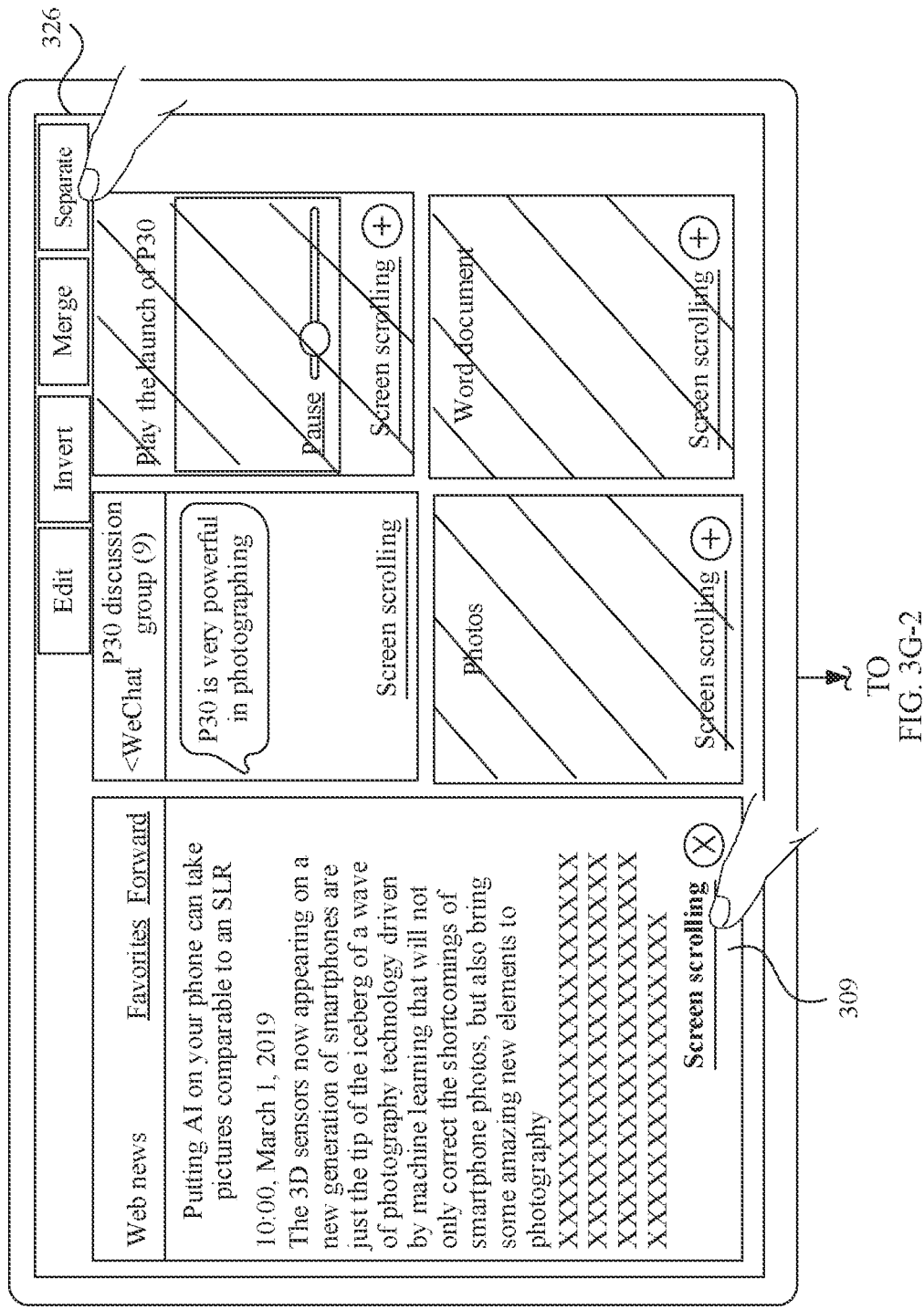

For example, as shown in FIG. 3G-1 and FIG. 3G-2, an interface 326 is an example of the second interface. In the interface 326, application windows that the user selects to display include a window of a browser application and a chat window of WeChat. After the user taps a scroll control 309 associated with a window of a NetEase news application and the separate control 310, the mobile phone generates two second screenshots: a picture 327 and a picture 328. It can be seen that the picture 327 shows an entire interface of the current window of the NetEase news application. The picture 328 shows an interface of the current chat window of the WeChat application.

When generating the picture 327, the mobile phone may automatically perform a screen scrolling operation on an application window with a screen scrolling function selected, and capture a screenshot of an entire interface of the window in a process of performing the screen scrolling operation.

For other content of the separate function, refer to descriptions of related content of the merge function. Details are not described herein again.

It may be understood that, when the user triggers a screenshot operation, the mobile phone may generate the second screenshot by using any one of the merge function or the separate function by default, or may generate the second screenshot by using both the merge function and the separate function. This is not limited in this embodiment of this application.

Optionally, if the mobile phone does not detect, within a preset time period, that the user taps the merge control 311 or the separate control 310, the mobile phone automatically generates the second screenshot by using the merge function or the separate function by default based on an application selected by the user. Optionally, if the mobile phone detects that the user continuously triggers a screenshot operation, the mobile phone may alternatively generate the second screenshot by using the merge function or the separate function by default. This is not limited in this embodiment of this application.

Optionally, if it is detected that the user performs different screenshot operations, the mobile phone may alternatively generate the second screenshot by using a different method by default. For example, when the user presses a power key and a volume-up key, the mobile phone generates the second screenshot by using the merge function by default. When the user presses the power key and a volume-down key, the mobile phone generates the second screenshot by using the separate function by default. For another example, when the user presses a power key and a volume key, the mobile phone generates the second screenshot by using the merge function by default. When the user taps a screenshot control in a notification bar, the mobile phone generates the second screenshot by using the separate function by default.

In addition, when generating the second screenshot, the mobile phone may further display prompt information, for example, "a photo is being saved".

In some examples, after generating the second screenshot, the mobile phone automatically saves the second screenshot in the gallery application, and the mobile phone automatically returns to an interface before the screenshot, that is, displays the first interface. In some other examples, after generating the second screenshot, the mobile phone automatically saves the second screenshot in the gallery application, and displays a thumbnail of the second screenshot in the displayed first interface. If the mobile phone displays an edit interface of the second screenshot when the user taps the thumbnail of the second screenshot, an operation such as cropping, graffiti, or forwarding may be performed on the second screenshot. Optionally, after the second screenshot is edited, the mobile phone returns to the first interface. If the thumbnail of the second screenshot disappears when the user taps a location other than the thumbnail of the second screenshot in the first interface, the mobile phone displays the first interface. This is not specifically limited in this embodiment of this application.

It can be learned that, in the screenshot method provided in this embodiment of this application, a mobile phone may automatically identify display areas of a plurality of application windows on a screen, and may automatically capture, based on selection by the user, content of an application window required by the user, so as to quickly take a screenshot of a specific area in an interface, meet user's personalized requirements, and improve user experience.

The foregoing embodiment is described by using an example in which the screen of the mobile phone is covered with application windows, that is, the first interface includes a plurality of application windows. In some other embodiments, the screen of the mobile phone may not be covered with application windows. To be specific, in addition to the application windows, the first interface may further display a part of a home screen, a status bar, a docking bar (dock), and the like. In this case, a display area of a non-application window on the screen may be used as one or more independent display areas. The user may also select whether to retain the one or more independent display areas in the final screenshot. That is, the one or more independent display areas may also be associated with one or more controls, for example, a delete control or an add control.

Figures 1, 3H:
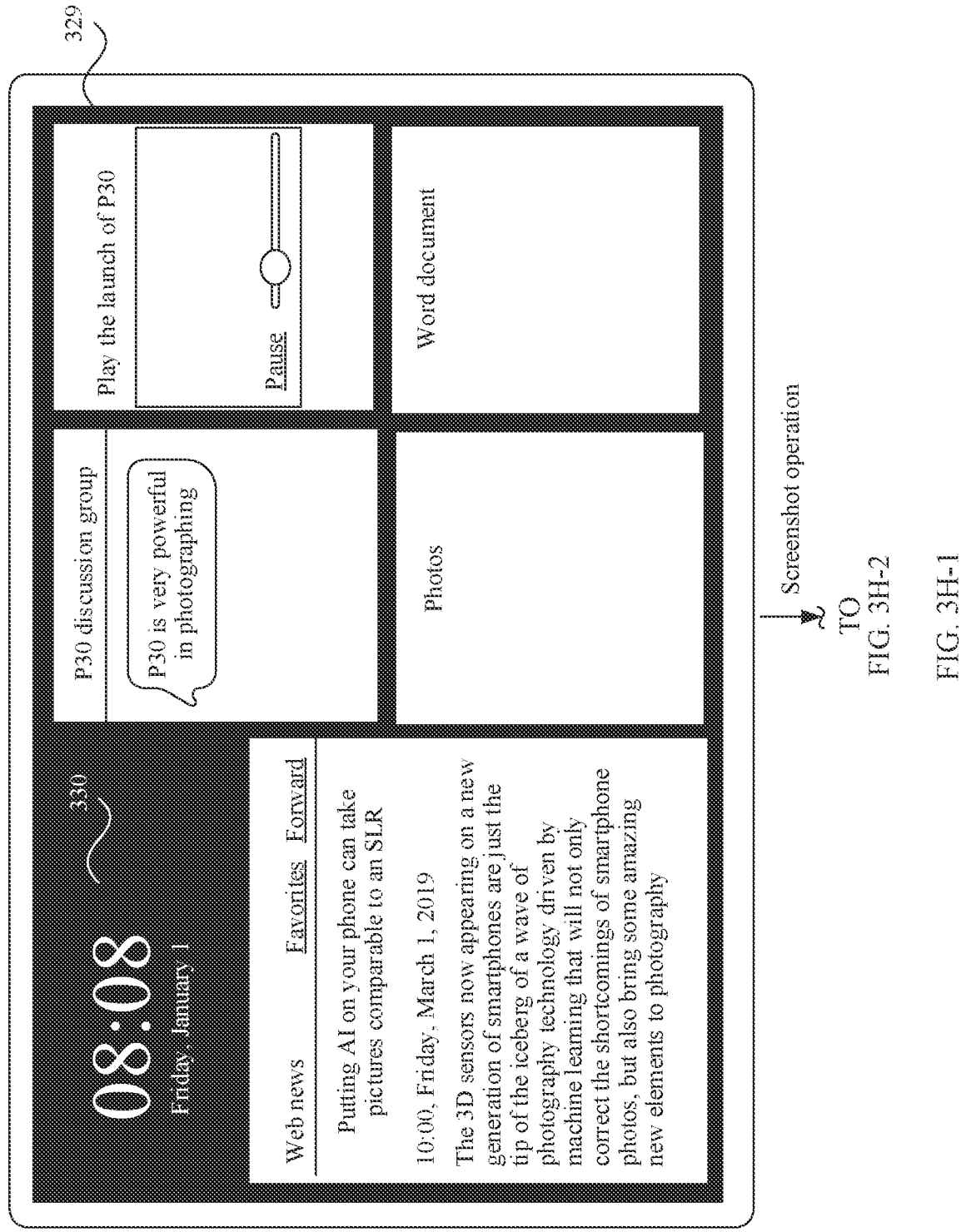
Figures 2, 3H:
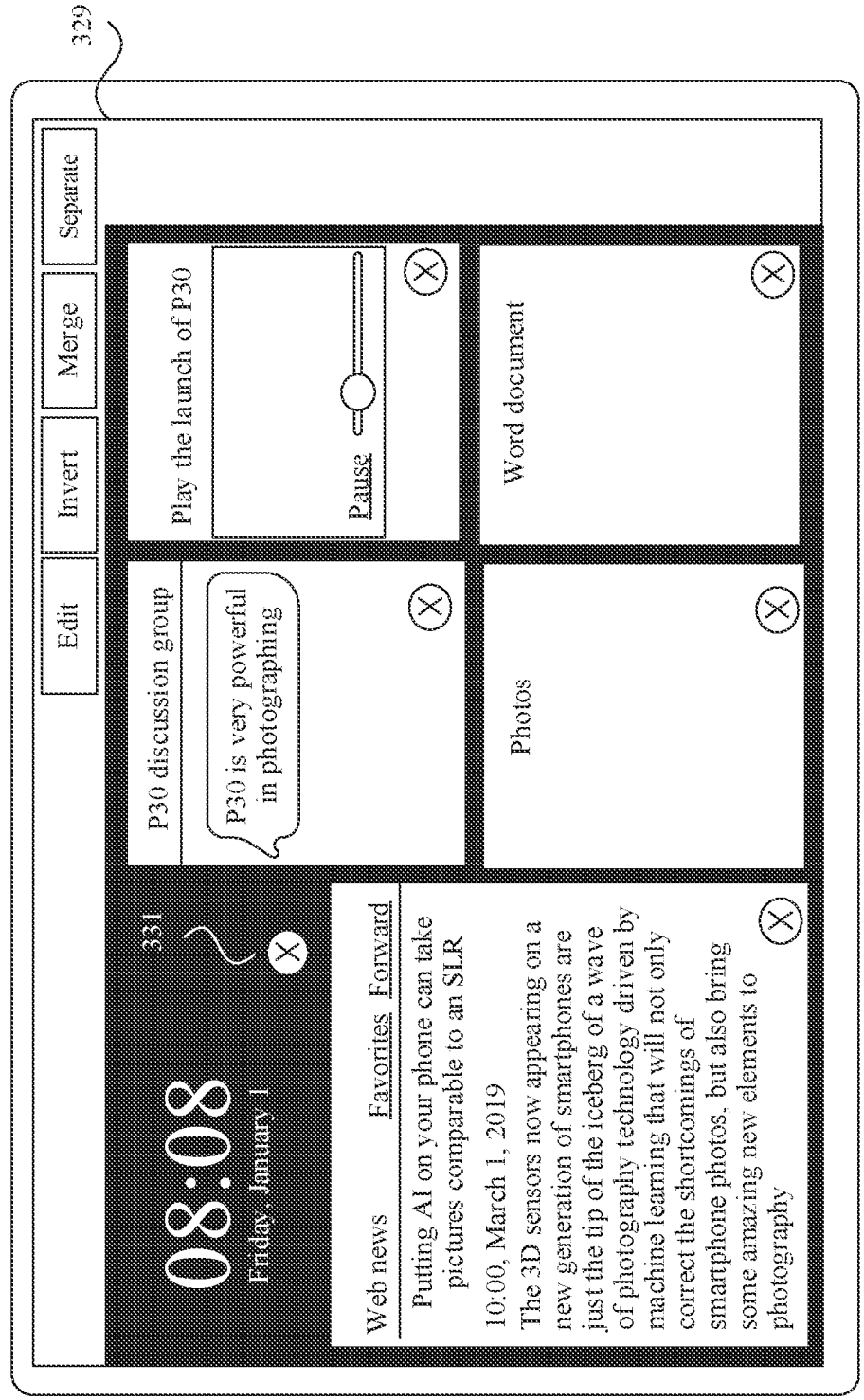

For example, as shown in FIG. 3H-1 and FIG. 3H-2, an interface 329 is another example of the first interface. In the interface 329, windows of a plurality of applications and a part of a home screen 330 are displayed. When detecting that the user performs a screenshot operation, the mobile phone takes a screenshot of a current screen, obtains information about each application on the current screen, and determines a display area of each application. The mobile phone may further determine, based on the obtained information about the display area of each application, a display area in which the part of the home screen in the first interface is located. Then, the mobile phone may display the second interface, that is, the interface 329. A display area of each application window in the interface 329 is associated with a delete control, and an area for displaying the home screen is also associated with a delete control 331. That is, the user may also select, by operating the delete control 331, whether to retain content of the part of the home screen in the second screenshot.

The foregoing describes in detail a process of taking one screenshot of interfaces of a plurality of application windows. Considering such a scenario, after taking one screenshot, the user may need to perform some operations on content of some application windows in the interface, and then take screenshots of these application windows again. Therefore, an embodiment of this application further provides an operation of locking an application window of which a screenshot still needs to be taken next time in a screenshot process. In this case, when the user takes another screenshot, the locked application window may be selected by default.

FIG. 4A-1 and FIG. 4A-2 to FIG. 4D-1 and FIG. 4D-2 are schematic diagrams of other interfaces of a mobile phone. The following describes in detail a locking solution provided in an embodiment of this application with reference to the accompanying drawings.

A user performs a screenshot operation on a first interface (for ease of description, the current screenshot operation is denoted as a first screenshot operation), and the mobile phone displays a second screen. The second interface displays a lock control associated with each application window, and the user may select, by using the lock control, an application window that needs to be retained in a next screenshot operation. To be specific, in a next screenshot operation, content of an application window that is locked by default needs to be retained in a final screenshot, and content of an application window that is not locked by default does not need to be retained in the final screenshot.

In some embodiments, the mobile phone may consider, by default, that an application window that needs to be retained in a current screenshot operation is in a locked state, and that an application window that does not need to be retained in the current screenshot operation is in an unlocked state, which may also be referred to as an unlocked state. Then, the user may switch the application window between the locked state and the unlocked state by operating the lock control.

Figures 1, 2, 4A:
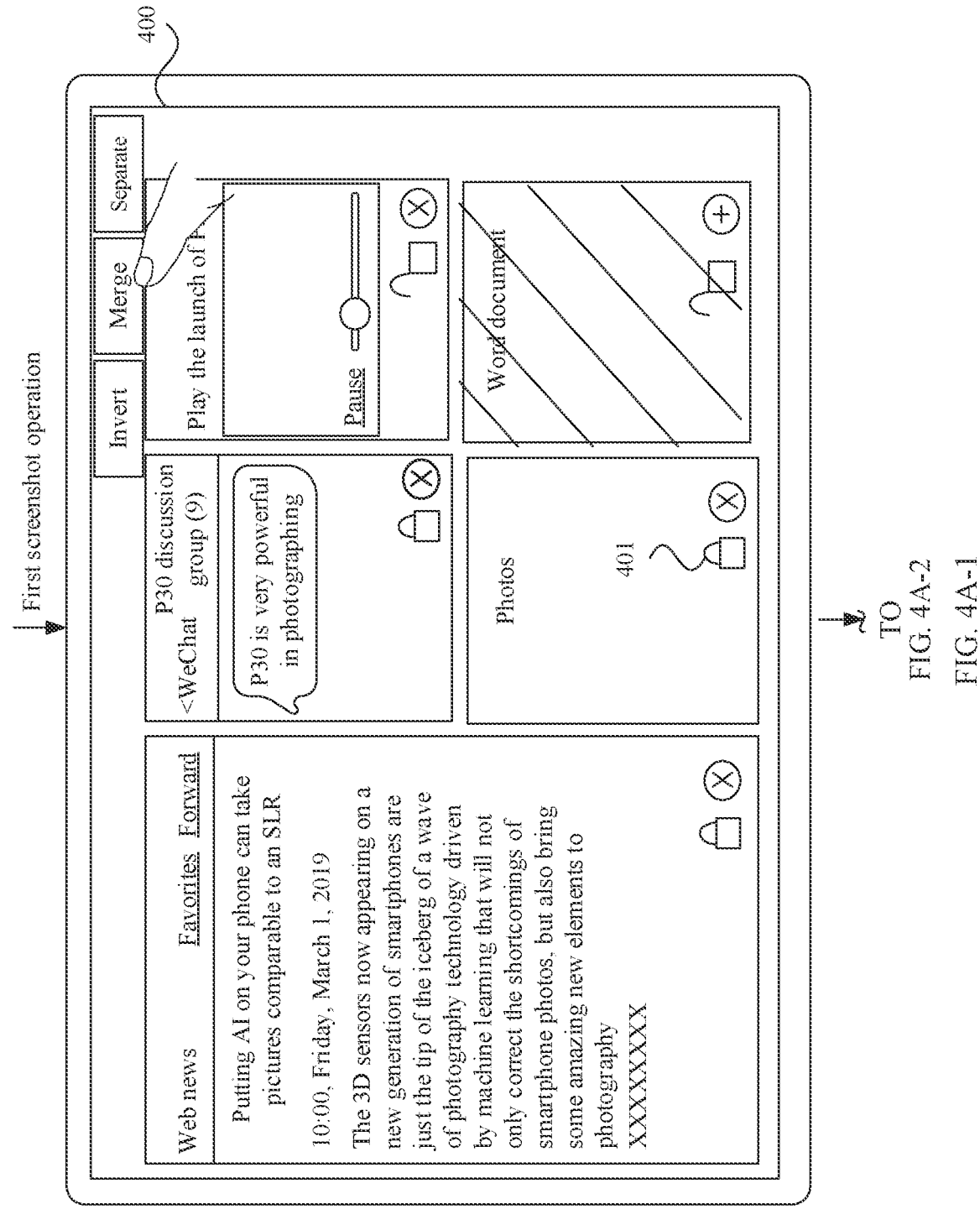
Figures 2, 4A:
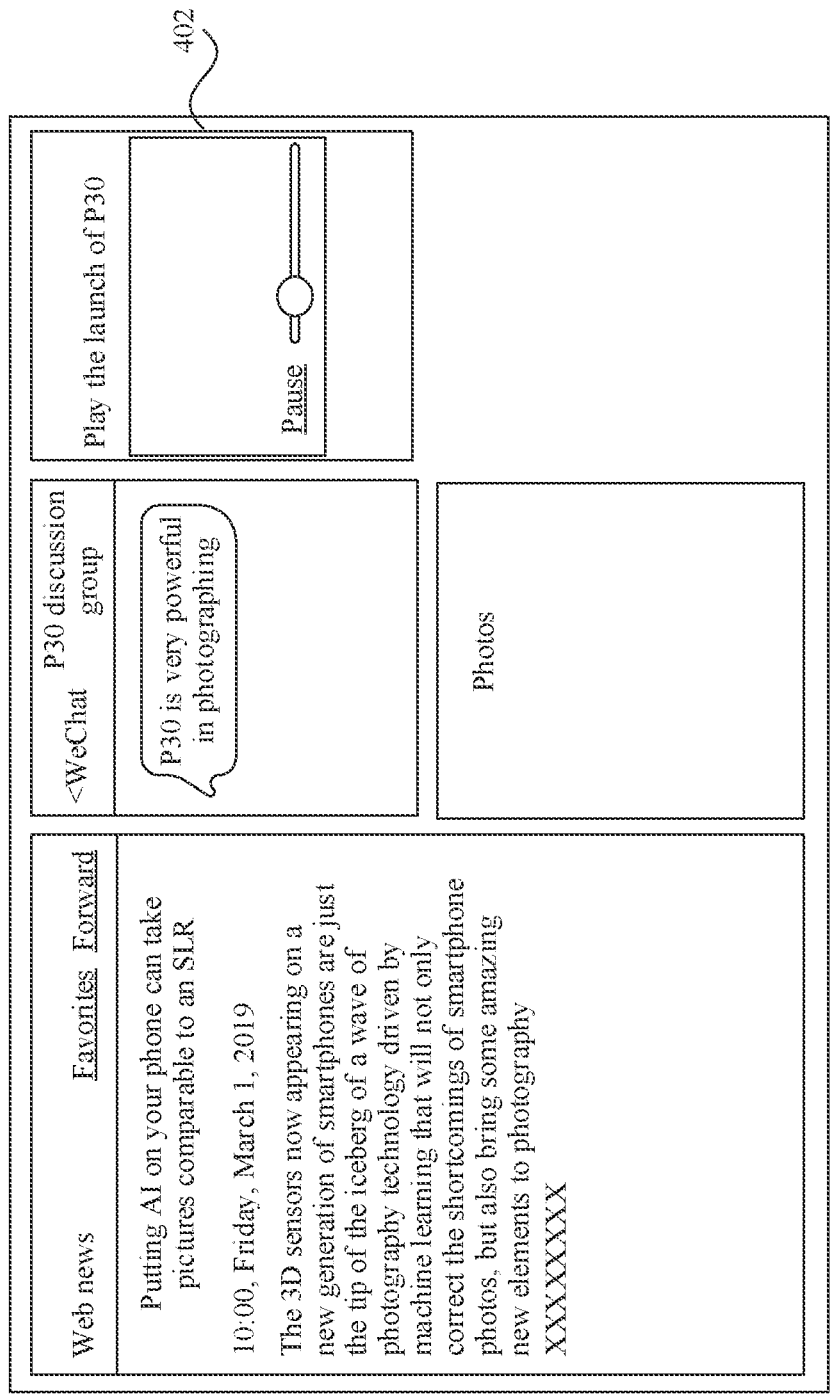

For example, as shown in FIG. 4A-1 and FIG. 4A-2, an interface 400 is an example of the second interface. In the interface 400, a display area of each application window displays a corresponding lock control. The user may use the lock control associated with each application window to select an application window that needs to be locked. For example, a window of a browser application, a chat window of a WeChat application, and a window of a gallery application are in a locked state, and a window of a video application and a window of a document application are in an unlocked state. In response to the user's operation of tapping a merge control, the mobile phone generates a picture in the current screenshot operation, for example, a picture 402. The picture 402 displays the window of the browser application, the chat window of the WeChat application, the window of the gallery application, and the window of the video application. To distinguish the current screenshot operation from a subsequent screenshot operation, the current screenshot operation is denoted as a first screenshot operation.

After the first screenshot operation is completed, the mobile phone returns to the first interface. The user continues to perform an operation in the first interface. For example, the user views other news by using the browser application, and there is new information in the chat window of the WeChat application, to obtain a third interface. When detecting that the user performs a screenshot operation (denoted as a second screenshot operation) in the third interface, the mobile phone captures a screenshot of the third interface. The screenshot of the third interface is appropriately pinched for display, that is, a fourth interface is displayed.

Figures 1, 4B:
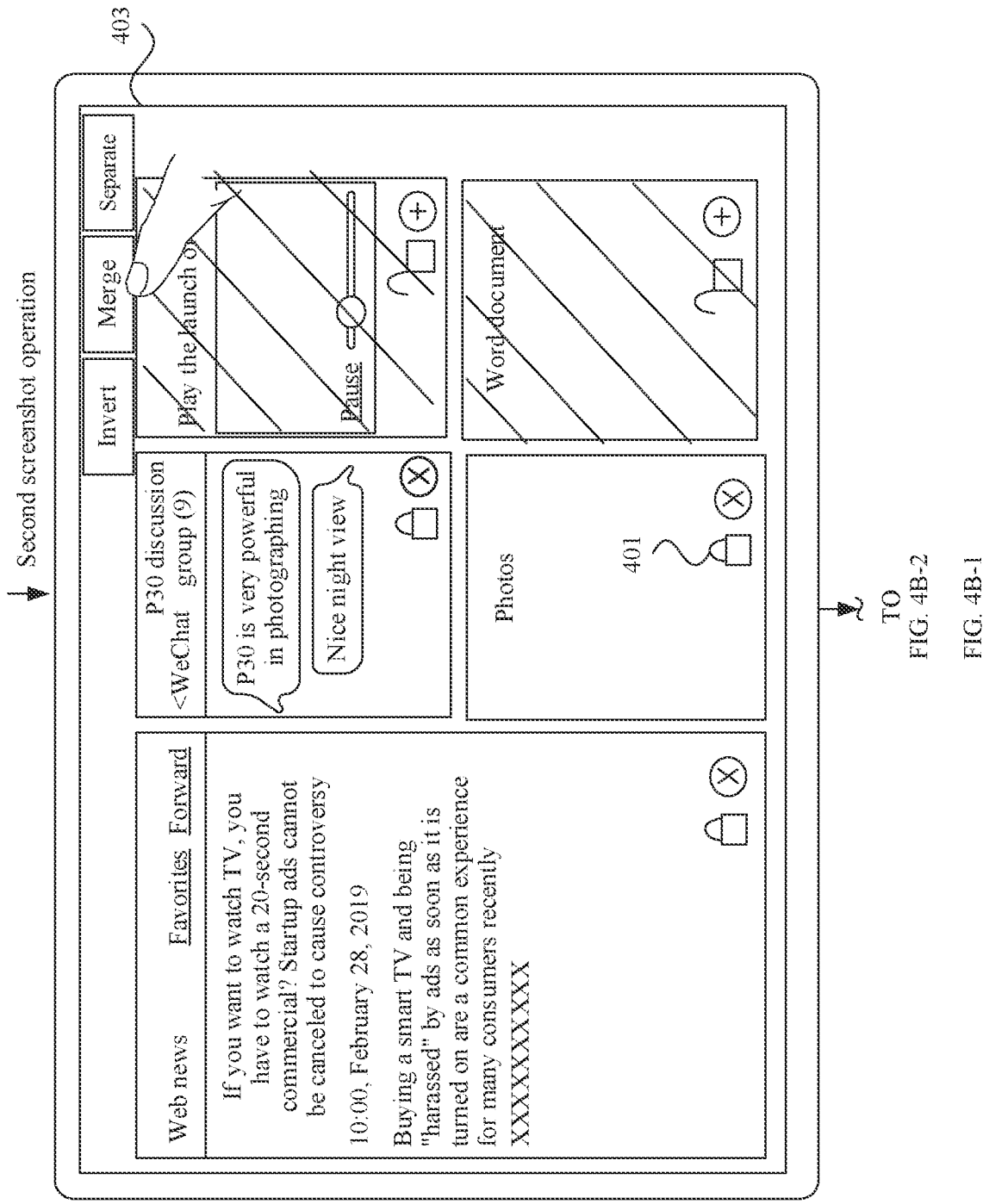

For example, as shown in FIG. 4B-1 and FIG. 4B-2, an interface 403 is an example of the fourth interface. By default, in the interface 403, an application window that is locked in the previous screenshot operation (that is, the first screenshot operation) is an application window that needs to be retained in the current screenshot operation (that is, the second screenshot operation), and an application window that is not locked in the previous screenshot operation is an application window that does not need to be retained in the current screenshot operation. That is, by default, the window of the browser application, the chat window of the WeChat application, and the window of the picture application are application windows that need to be retained in the second screenshot operation. Certainly, the user may also delete, by using a delete control, an application window that the user does not want to retain, or restore, by using an add control, an application window that the user wants to retain. Herein, an example in which the user does not modify an application window that is retained by default is used for description. In response to the user's operation of tapping the merge control in the third interface, the mobile phone generates a new screenshot, for example, the picture 404. The picture 404 displays content of the window of the browser application, content of the chat window of the WeChat application, and content of the window of the gallery application. Optionally, the mobile phone may alternatively automatically crop an area in which no application window content is displayed, so as to reduce a size of a screenshot.

The user may further switch an application window between a locked state and an unlocked state by operating a lock control associated with the application window. Alternatively, the user may further exit a locked application window to switch the application window from a locked state to an unlocked state. This is not limited in this application.

Figures 1, 4C:
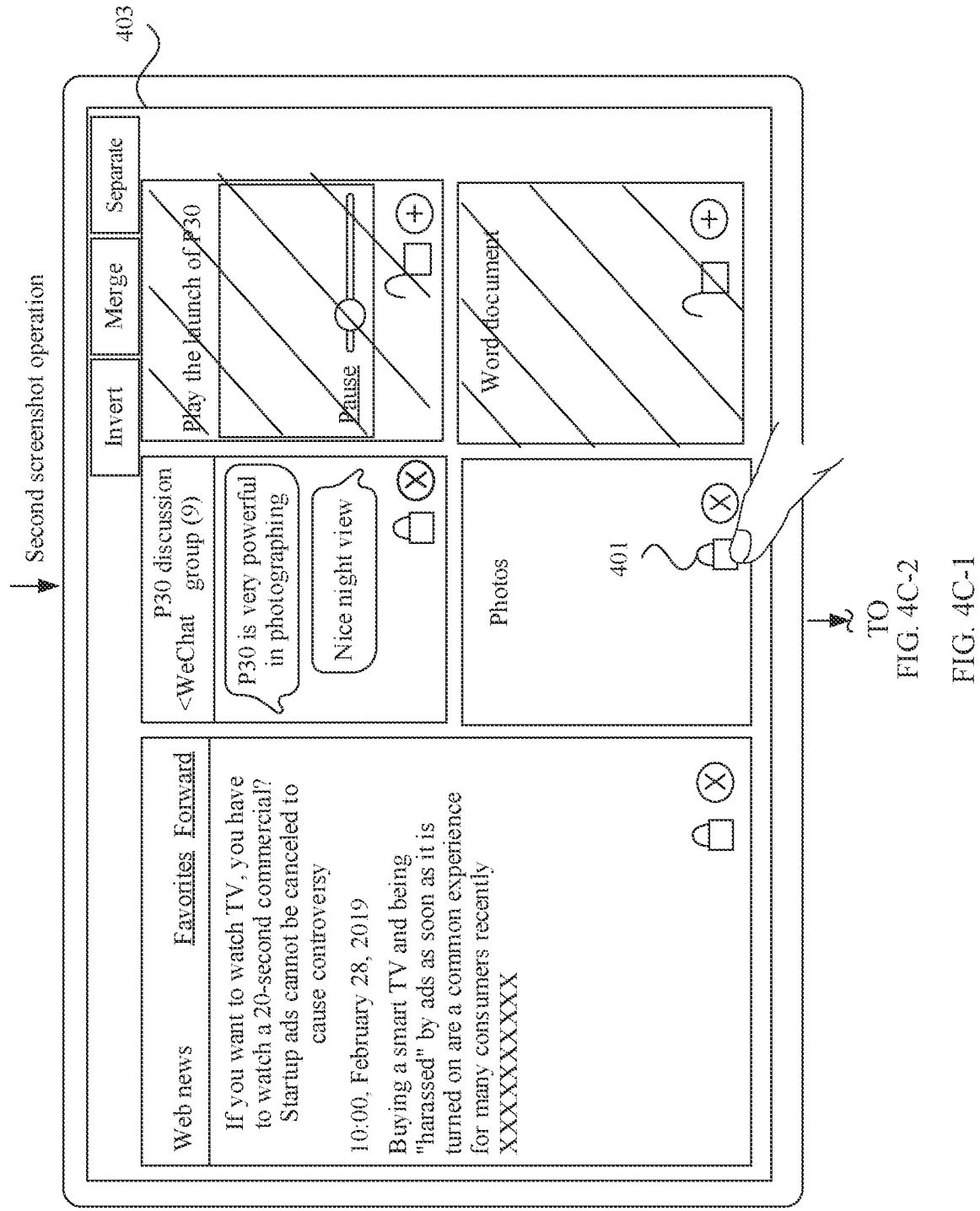
Figures 2, 4C:
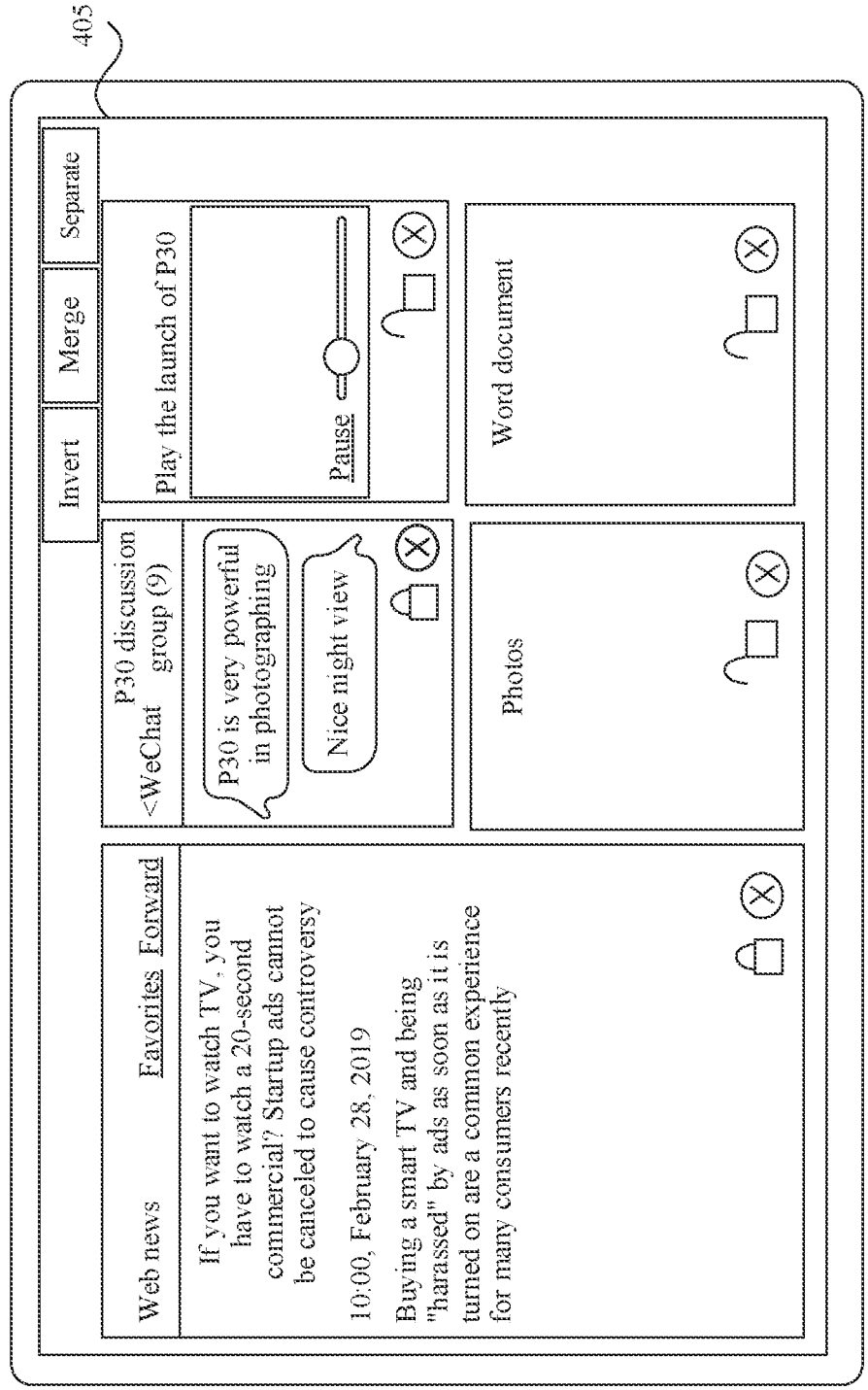

For example, an example in which the interface 403 is the fourth interface is still used for description. As shown in FIG. 4C-1 and FIG. 4C-2, the window of the gallery application that is displayed in the interface 403 is in a locked state. In response to the user's operation of tapping a lock control 401, the mobile phone switches the window of the gallery application to an unlocked state, as shown in an interface 405. That is, after the mobile phone completes the second screenshot operation, if it is detected again that the user performs a screenshot operation (denoted as a third screenshot operation), the mobile phone considers, by default, that the window of the gallery application is an application window that does not need to be retained in the third screenshot operation, that is, considers, by default, that a screenshot generated in the third screenshot operation does not display the content of the gallery application window.

It should be noted that, after the application window is locked, a location of the application window changes, but the application window is still in a locked state.

Figures 1, 2, 4D:
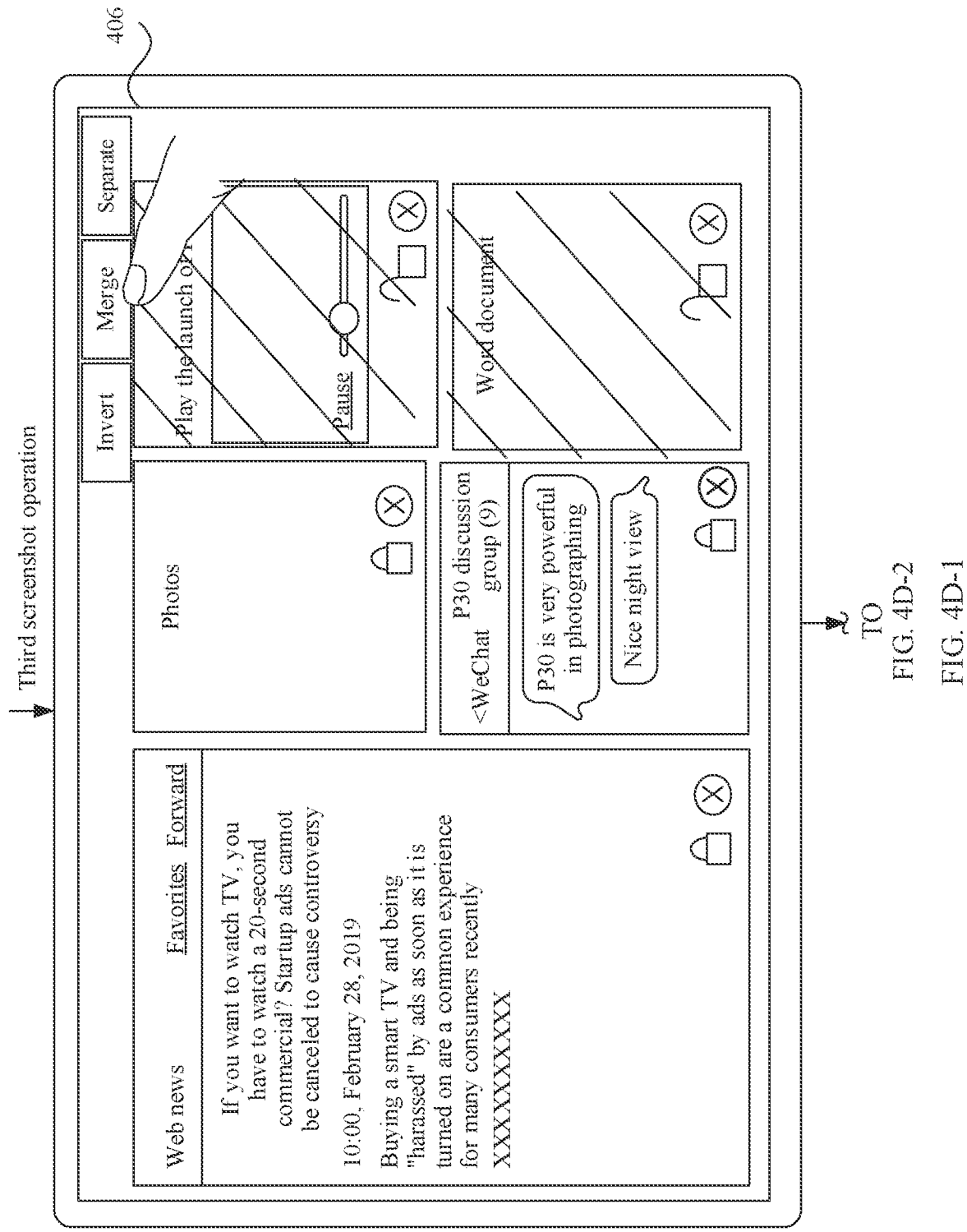
Figures 2, 4D:
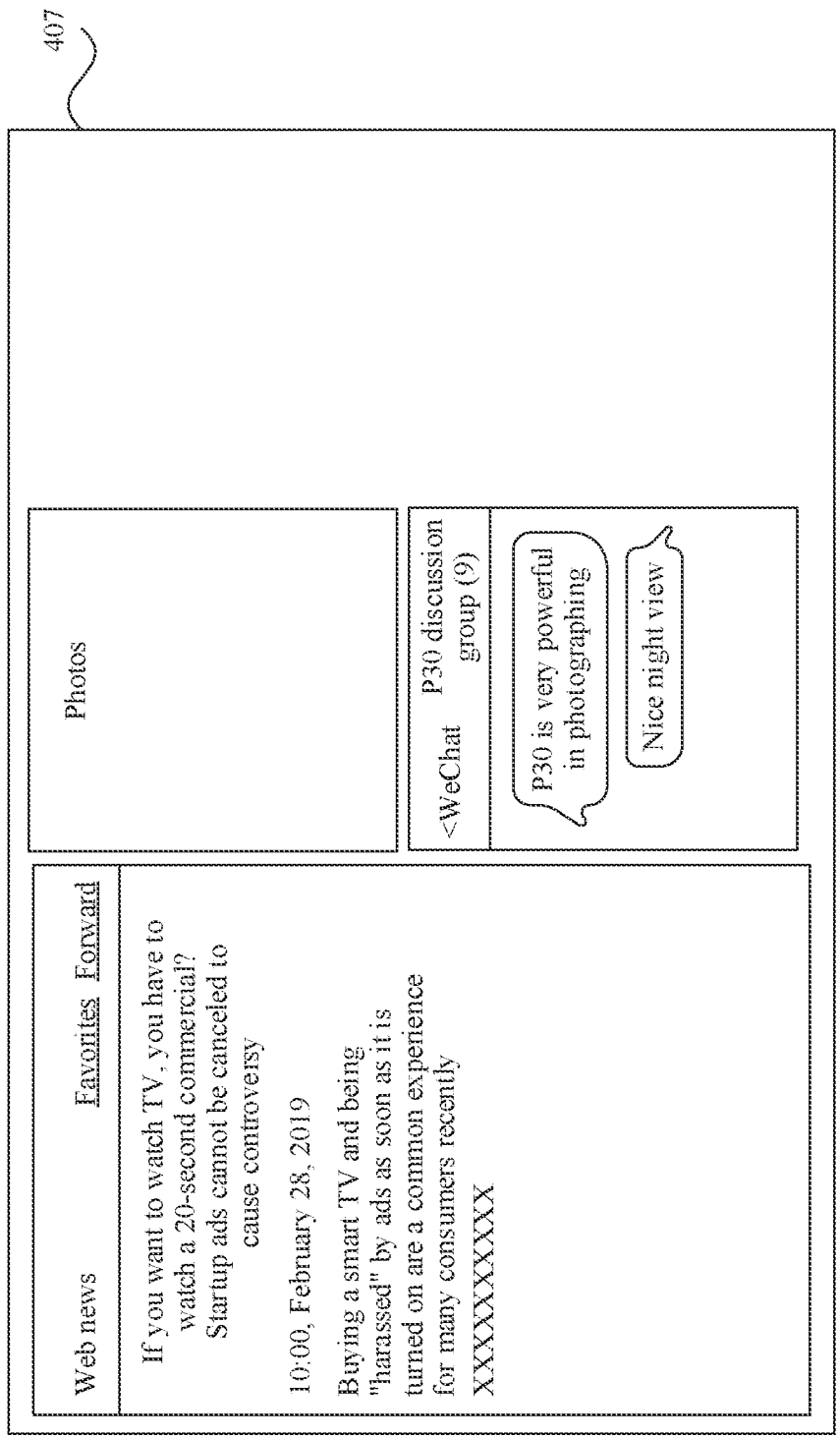

For example, an example in which the interface 403 is the fourth interface is still used for description. When the second screenshot operation is completed, the mobile phone returns to the third interface. An arrangement of application windows in the third interface is the same as an arrangement of application windows in the fourth interface. If the user moves locations of some application windows, the application windows are still in a locked state. For example, in the third interface, the user exchanges the chat window of the WeChat application with the window of the gallery application. When the mobile phone detects a screenshot operation (that is, a third screenshot operation) again, as shown in FIG. 4D-1 and FIG. 4D-2, the mobile phone displays an interface 406. In the interface 406, the window of the browser application, the window of the gallery application, and the chat window of the WeChat application are all application windows that need to be retained in the third screenshot operation by default, and are all in a locked state. In response to the user's operation of tapping the merge control, the mobile phone generates a screenshot in the third screenshot operation, that is, a picture 407.

The following describes an example of internal implementation of locking some application windows.

It is detected that the user performs a screenshot operation in the first interface, and the mobile phone displays the second interface. The user may select a locked application window in the second interface by using a lock control. In this case, the mobile phone (for example, a screenshot application) records an identifier of an application window in a locked state (or an identity of an application, for example, a package name of the application). That is, the mobile phone maintains an application in a locked state or a list of windows of applications in a locked state.

Then, after the current screenshot operation is completed, the mobile phone returns to the first interface. The user continues to perform an operation on the first interface to obtain the third interface. After detecting that the user performs a screenshot operation on the third interface again, the mobile phone captures a screenshot of an entire interface of the third interface, and obtains information such as an identifier, coordinates, and a location of each application in the third interface. In addition, the mobile phone reads a stored application in a locked state or a stored list of windows of applications in a locked state.

Then, the windows of the applications included in the list are compared with windows of currently obtained applications (that is, windows of applications displayed in the third interface), and an overlapped application window is set as an application window that needs to be retained in the final screenshot by default.

If the list includes a window of an application, but the third interface does not display the window of the application, it indicates that the user has exited the application. In this case, the mobile phone may update the list, delete an identifier of the window of the application, or set the window of the application to a non-locked state. Certainly, in some other embodiments, when a window of an application in a locked state exits, the mobile phone may immediately update the list, delete an identifier of the exited window of the application, or set the exited window of the application to a non-locked state.

If the third interface displays a window of an application, but the list does not include the window of the application, it indicates that the application may be an application newly opened by the user, or may be an unlocked application.

Then, the user may further switch a locked state of a window of an application by operating the lock control in the third interface, and the mobile phone updates the list in time according to an operation of the user, so that the list is invoked in a next screenshot.

In addition, in other scenarios, the user may frequently take screenshots of windows of some applications, for example, a window of a messages application, a window of WeChat, window of a video application, and a window of a browser application. The user may also configure an application of which a screenshot is frequently taken, that is, configure the application of which a screenshot is frequently taken to a locked state. In this way, when the user performs a screenshot operation, the mobile phone may set, by default, a window of an application that is included in the current screen and of which a screenshot is frequently taken as a window that needs to be retained. In this way, screenshot efficiency is improved, and user experience is improved. In this scenario, unlocking of the locked state of the application of which a screenshot is frequently taken is set by the user.

In a specific implementation, the user may select, through system settings or settings of the screenshot application, to set an application of which a screenshot is frequently taken to a locked state. Subsequently, the user can switch a locked state to an unlocked state only through the system settings or the settings of the screenshot application.

It may be understood that the user may select locking methods in different scenarios by performing different screenshot operations. For example, when the user presses a power key and a volume key, the mobile phone uses the locking method in the first scenario by default, to set an application window that needs to be retained by default. When the user taps a screenshot control in a notification bar, the mobile phone uses the locking method in the second scenario by default, to set an application window that needs to be retained by default.

In the foregoing embodiment, after a screenshot operation of the user is detected, a screenshot of an entire screen (for example, a first screenshot) is first captured, and then one or more application windows that need to be to retained or deleted are selected from the screenshot of the entire screen according to an operation performed by the user on the application window, to obtain a final screenshot (for example, a second screenshot). In some other embodiments, a screenshot of an entire screen may not be captured, but an application window that needs to be retained or deleted by the user may be directly determined based on an operation performed by the user on the application window, and screenshots of one or more application windows that need to be retained are directly obtained, to obtain a final screenshot.

For example, in response to detecting a screenshot operation performed by the user on the first interface, the screenshot application or function in the mobile phone may invoke a window management service at an application framework layer to obtain an identifier of an application window (or an identifier of an application) displayed in the current screen, for example, an identifier of an APP 1, an identifier of an APP 2, and an identifier of an APP 3. Then, the mobile phone may draw, in the first interface or a new interface, a control associated with each current application window, for example, a first control associated with the APP 1, a second control associated with the APP 2, and a third control associated with the APP 3. The user may select or deselect the application window corresponding to each control by operating the control. The selection operation is selecting an application window that needs to be retained in the final screenshot. The deselection operation is selecting an application window that does not need to be retained in the final screenshot.

An application window that needs to be retained in the final screenshot is determined according to an operation performed by the user on the control corresponding to each application window. For example, application windows selected by the user are the APP 1 and the APP 2, or an application window deselected by the user is the APP 3. In this case, the mobile phone may determine that the final screenshot needs to display the application windows of the APP 1 and the APP 2, and does not need to display the application window of the APP 3.

Then, the mobile phone may obtain information about the corresponding application window (for example, information such as a size and coordinates of the application window of the APP 1, and information such as a size and coordinates of the application window of the APP from the WMS based on the identifier of the selected application window or the identifier of the selected application (for example, the identifier of the APP 1 and the identifier of the APP 2). In addition, the mobile phone may further obtain, based on the identifier of the selected application window, a cache (cache) of obtaining a decor view (Decor View) of each application in each application, that is, obtain interface content of each application window (for example, interface content of the APP 1 and interface content of the APP 2). For example, the cache of the decor view is obtained from the APP 1, that is, content displayed in the window of the APP 1 is obtained. The cache of the decor view is obtained from the APP 2, that is, content displayed in the window of the APP 2 is obtained. It may be noted that, in an embodiment, interface content of an application window deselected by the user does not need to be obtained, for example, display content in the window of the APP 3 does not need to be obtained.

Then, a final screenshot is drawn based on the obtained information such as the size and the coordinates of each application window (the information such as the size and the coordinates of each application window is used to represent a size and a location of each application window in the first interface), and the interface content of each application window. In some examples, the obtained screenshot of each application window retains a size and a location of each application window in an original interface.

If the user selects a merge function, the final screenshot includes content of a plurality of application windows that need to be retained. In some examples, a size of the final screenshot is the same as a size of the first interface, and locations and sizes of the plurality of application windows in the final screenshot are the same as locations and sizes of the plurality of application windows in the first interface. That is, the interface content of each application window is presented by using the obtained information such as the size and the coordinates of each application window. In some other examples, a size of the final screenshot is the same as a size of the first interface, and locations and sizes of the plurality of application windows in the final screenshot are different from locations and sizes of the plurality of application windows in the first interface. That is, after appropriate adjustment is performed, the interface content of each application window is presented based on the obtained information such as the size and the coordinates of each application window. For example, the obtained size of the APP 1 is scaled in a specific proportion, and used as an actual size of the window of the APP 1 in the final screenshot. In this case, a size of the window of the APP 1 in the final screenshot is different from a size of the APP 1 in the first interface. For another example, the obtained coordinates of the APP 1 are modified. For example, an upper left vertex A of the application window of the APP 1 is transformed into A', and the size of the APP 1 remains unchanged. In this case, a location of the window of the APP 1 in the screenshot is different from a location of the window of the APP 1 in the first interface, and a size of the window of the APP 1 in the screenshot is different from a size of the window of the APP 1 in the first interface. In other examples, a size of the final screenshot may be different from a size of the first interface. In this case, a relative location of each application window in the final screenshot may be the same as or different from a relative location of each application window in the first interface.

It should be noted that, for a relationship between a size and a location of each application window in the final screenshot and a size and a location of each application window in the first interface, refer to descriptions in the foregoing embodiment. Details are not described herein again.

If the user selects the separate function, the final screenshot includes a plurality of pictures, and each picture includes content of at least one application window that is selected by the user and that needs to be retained. An example in which the windows of the APP 1, the APP 2, and the APP 3 are displayed in the first interface, and the user selects to retain the APP 1 and the APP 2 in the final screenshot is still used. In this case, the final screenshot includes two pictures, one picture displays the content of the window of the APP 1, and the other picture displays the content of the window of the APP 2. In some examples, if a size of the final screenshot is the same as a size of the first interface, the mobile phone may separately perform drawing based on information such as a size and coordinates of each application window that needs to be retained and interface content of each application window, to obtain a plurality of pictures, that is, the final screenshot. In this case, a location and a size of each application window in the final screenshot is the same as a location and a size of each application window in the first interface. For example, a screenshot including the content of the window of the APP 1 is drawn based on the previously obtained information such as the size and the location of the APP 1 and the content of the window of the APP 1. Similarly, a screenshot including the content of the window of the APP 2 may be obtained. In some other examples, it is considered that only one application window is included in the final screenshot, and a location and/or a size of the application window may also be adjusted. For example, the mobile phone may separately perform drawing based on a size of each application window that needs to be retained and interface content of each application window, to obtain the final screenshot. That is, a specific location of each application window in the final screenshot may be a default location (for example, a center location). In this case, a size of each application window in the final screenshot is the same as a size of each application window in the first interface, but a location of each application window in the final screenshot is different from a location of each application window in the first interface. For another example, the mobile phone may separately perform drawing based on interface content of each application window that needs to be retained, to obtain the final screenshot. That is, a specific location of each application window in the final screenshot and a preset size of each application window may be by default. In this case, a size and a location of each application window in the final screenshot are different from a size and a location of each application window in the first interface. In some other examples, a size of the final screenshot may be different from a size of the first interface.

It should be noted that, for a relationship between a size and a location of each application window in the final screenshot and a size and a location of each application window in the first interface, refer to descriptions in the foregoing embodiment. Details are not described herein again.

In this embodiment, for other content, refer to descriptions of related content in the foregoing embodiment. Details are not described again.

It should be noted that the foregoing embodiments may be combined randomly on a premise that the solutions are not contradictory.

It may be understood that, to implement the foregoing functions, the terminal and the like include corresponding hardware structures and/or software modules for performing the functions. A person skilled in the art should easily be aware that, in combination with the examples described in the embodiments disclosed in this specification, units, algorithms, and steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of the present invention.

In the embodiments of this application, the terminal or the like may be divided into function modules based on the foregoing method examples. For example, each function module may be obtained through division based on each corresponding function, or two or more functions may be integrated into one processing module. The integrated module may be implemented in a form of hardware, or may be implemented in a form of a software functional module. It should be noted that, in this embodiment of the present invention, module division is an example, and is merely a logical function division. In actual implementation, another division manner may be used.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or some of the functions described above. For a detailed working process of the foregoing system, apparatus, and unit, refer to a corresponding process in the foregoing method embodiments, and details are not described herein again.

Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of the embodiments of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device or a processor to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A screenshot method implemented by a terminal, wherein the screenshot method comprises:
   displaying a first interface comprising N areas, wherein N is an integer greater than or equal to 2;
   receiving a first operation of a user;
   displaying, in response to the first operation, a second interface comprising N controls, wherein the N controls are in a one-to-one correspondence with the N areas, and wherein each of the N controls is configured to select or deselect first content of a corresponding area of the N areas;
   receiving, on the N controls, a second operation of the user;
   determining, in response to the second operation, a selected area in the N areas;
   receiving a third operation of the user; and
   generating, in response to the third operation, either a first picture comprising second content of the selected area or M pictures, wherein each of the M pictures comprises third content of one of X areas in the N areas.

2. The screenshot method of claim 1, further comprising displaying, in each of the N areas, a window of an application or a part of a home screen interface.

3. The screenshot method of claim 1, wherein:
   a first size of the selected area in the first picture or a first location of the selected area in the first picture is the same as a second size of the selected area in the first interface or a second location of the selected area in the first interface; or
   picture the first size and the first location are different from the second size and the second location.

4. The screenshot method of claim 1, further comprising:
   performing a screenshot operation on the first interface to obtain a second picture before generating either the first picture or the M pictures and after receiving the first operation; and
   further generating, based on the second picture, either the first picture or the M pictures.

5. The screenshot method of claim 4, further comprising:
   obtaining a size of the selected area in the first interface or a location of the selected area in the first interface; and
   further generating, based on the size or the location, either the first picture or the M pictures.

6. The screenshot method of claim 4, further comprising:
   cropping fourth content of an unselected area in the N areas in the second picture, to obtain to obtain the first picture; or
   modifying the fourth content to a preset pattern to obtain the first picture.

7. The screenshot method of claim 4, further comprising:
   separately cropping fourth content of selected areas in the N areas from the second picture to obtain fifth content of cropped areas; and
   synthesizing the fifth content to obtain the first picture.

8. The screenshot method of claim 2, further comprising:
   obtaining a cache of a decor view of an application corresponding to the selected area before generating either the first picture or the M pictures; and
   further generating, based on the cache, either the first picture or the M pictures.

9. The screenshot method of claim 8, further comprising:
   obtaining a size of the selected area in the first interface or a location of the selected area in the first interface; and
   further generating, based on the size or the location either the first picture based the M pictures.

10. The screenshot method of claim 1, wherein the second interface further comprises N lock controls that are in a one-to-one correspondence with the N areas, wherein each of the N lock controls is configured to lock or unlock the first content, and wherein before receiving the third operation, the screenshot method further comprises:
    receiving, on the N lock controls, a fourth operation of the user; and
    determining, in response to the fourth operation, a first locked area in the N areas, and
    wherein after generating the first picture, the screenshot method further comprises:
    displaying the first interface;
    receiving a fifth operation of the user; and
    displaying, in response to the fifth operation, a third interface, wherein a second locked area in the N areas in the third interface is a second selected area by default.

11. A terminal comprising:
a memory configured to store computer program code comprising computer instructions; and
a processor coupled to the memory, wherein when executed by the processor, the computer instructions cause the terminal to:
  display a first interface comprising N areas, wherein N is an integer greater than or equal to 2;
  receive a first operation of a user;
  display, in response to the first operation, a second interface comprising N controls, wherein the N controls are in a one-to-one correspondence with the N areas, and wherein each of the N controls is configured to select or deselect first content of a corresponding area of the N areas;
  receive, on the N controls, a second operation of the user;
  determine, in response to the second operation, a selected area in the N areas;
  receive a third operation of the user; and
  generate, in response to the third operation, either a first picture comprising second content of the selected area or M pictures, wherein each of the M pictures comprises third content of one of selected X areas in the N areas.

12. The terminal of claim 11, wherein when executed by the processor, the computer instructions further cause the terminal to display, in each of the N areas, a window of an application or a part of a home screen interface.

13. The terminal of claim 11, wherein:
a first size of the selected area in the first picture or a first location of the selected area in the first picture is the same as a second size of the selected area in the first interface or a second location of the selected area in the first interface; or
first size and the first location are different from the second size and the second location.

14. The terminal of claim 11, wherein when executed by the processor, the computer instructions further cause the terminal to:
  perform a screenshot operation on the first interface to obtain a second picture before generating either the first picture or the M pictures and after receiving the first operation; and
  further generate, based on the second picture, the first picture or the M pictures.

15. The terminal of claim 14, wherein when executed by the processor, the computer instructions further cause the terminal to:
  obtain a size of the selected area in the first interface or a location of the selected area in the first interface; and
  further generate, based on the size or the location, either the first picture or the M pictures.

16. The terminal of claim 14, wherein when executed by the processor, the computer instructions further cause the terminal to:
  crop fourth content of an unselected area in the N areas in the second picture to obtain the first picture; or
  modify the fourth content to a preset pattern to obtain the first picture.

17. The terminal of claim 14, wherein when executed by the processor, the computer instructions further cause the terminal to:
  separately crop fourth content of selected areas in the N areas from the second picture to obtain fifth content of cropped areas; and
  synthesize the fifth content to obtain the first picture.

18. The terminal of claim 12, wherein when executed by the processor, the computer instructions further cause the terminal to:
  obtain a cache of a decor view of an application corresponding to the selected area before generating the first picture or the M pictures; and
  further generate, based on the cache, either the first picture or the M pictures.

19. The terminal of claim 18, wherein when executed by the processor, the computer instructions further cause the terminal to:
  obtain a size of the selected area in the first interface or a location of the selected area in the first interface; and
  further generate, based on the size or the location, either the first picture or the M pictures.

20. The terminal of claim 11, wherein the second interface further comprises N lock controls that are in a one-to-one correspondence with the N areas, wherein each of the N lock controls is configured to lock or unlock the first content, and wherein before receiving the third operation, when executed by the processor, the computer instructions further cause the terminal to:
  receive, on the N lock controls, a fourth operation of the user; and
  determine, in response to the fourth operation, a first locked area in the N areas, and
  wherein after generating the first picture, when executed by the processor, the computer instructions further cause the terminal to:
    display the first interface;
    receive a fifth operation of the user; and
    display, in response to the fifth operation, a third interface, wherein a second locked area in the N areas in the third interface is a second selected area by default.

21. A computer program product comprising computer-executable instructions that are stored on a non-transitory computer-readable medium and that, when executed by a processor, cause an apparatus to:
  display a first interface comprising N areas, wherein N is an integer greater than or equal to 2;
  receive a first operation of a user;
  display, in response to the first operation, a second interface comprising N controls, wherein the N controls are in a one-to-one correspondence with the N areas, and wherein each of the N controls is configured to select or deselect first content of a corresponding area of the N areas;
  receive, on the N controls, a second operation of the user;
  determine, in response to the second operation, a selected area in the N areas;
  receive a third operation of the user; and
  generate, in response to the third operation, either a first picture comprising second content of the selected area or M pictures, wherein each of the M pictures comprises third content of one of selected X areas in the N areas.

* * * * *

UNITED STATES PATENT AND TRADEMARK OFFICE
CERTIFICATE OF CORRECTION

PATENT NO. : 11,669,242 B2
APPLICATION NO. : 17/609109
DATED : June 6, 2023
INVENTOR(S) : Liudong Xiong It is certified that error appears in the above-identified patent and that said Letters Patent is hereby corrected as shown below:

In the Claims

Claim 3, Column 34, Line 10: "picture the first size" should read "the first size"

Claim 6, Column 34, Line 28: "second picture, to obtain" should read "second picture to obtain"

Signed and Sealed this
Eighth Day of August, 2023

Katherine Kelly Vidal
*Director of the United States Patent and Trademark Office*